US009542410B2

(12) United States Patent
Mayer et al.

(10) Patent No.: US 9,542,410 B2
(45) **Date of Patent: *Jan. 10, 2017**

(54) SOURCE-TO-PROCESSING FILE CONVERSION IN AN ELECTRONIC DISCOVERY ENTERPRISE SYSTEM

(71) Applicant: BANK OF AMERICA CORPORATION, Charlotte, NC (US)

(72) Inventors: Michael J. Mayer, Charlotte, NC (US); David M. Andersen, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,670

(22) Filed: Feb. 24, 2016

(65) Prior Publication Data

US 2016/0196276 A1 Jul. 7, 2016

Related U.S. Application Data

(63) Continuation of application No. 12/534,375, filed on Aug. 3, 2009, now Pat. No. 9,330,374.

(Continued)

(51) Int. Cl.

*G06F 17/30* (2006.01)
*G06Q 10/10* (2012.01)
*H04L 12/58* (2006.01)

(52) U.S. Cl.

CPC ... *G06F 17/30153* (2013.01); *G06F 17/30076* (2013.01); *G06F 17/30371* (2013.01);

(Continued)

(58) Field of Classification Search

CPC .............. H04L 51/046; G06F 17/30569; G06F 17/30371; G06F 17/30076; G06F 17/30153; G06F 17/30997; G06Q 10/10

See application file for complete search history.

(56) References Cited

U.S. PATENT DOCUMENTS

| | | |
|---|---|---|
| 5,497,317 A | 3/1996 | Hawkins et al. |
| 6,119,137 A | 9/2000 | Smith et al. |

(Continued)

FOREIGN PATENT DOCUMENTS

| | | |
|---|---|---|
| EP | 1093068 A2 | 4/2001 |
| EP | 1349089 A2 | 1/2003 |

(Continued)

OTHER PUBLICATIONS

European Patent Office. European Office Action dated Apr. 26, 2012. European Application No. 10 250 582.3. Name of Applicant: Bank of America Corporation. English Language 10 pages.

(Continued)

*Primary Examiner* — Brannon W Smith

(74) *Attorney, Agent, or Firm* — Michael A. Springs; Moore & Van Allen PLLC; W. Kevin Ransom

(57) ABSTRACT

Embodiments of the invention relate to systems, methods, and computer program products for improved electronic discovery. Embodiments herein disclosed provide for an enterprise-wide e-discovery system that provides for source-to-processing file conversion of electronic communications and, in some embodiments, decryption of encrypted electronic communication entries for the purpose of efficiently processing data and supplying the electronic data to third party data analysis providers.

38 Claims, 16 Drawing Sheets

Related U.S. Application Data

(60) Provisional application No. 61/164,276, filed on Mar. 27, 2009.

(52) U.S. Cl.
CPC .. *G06F 17/30569* (2013.01); *G06F 17/30997* (2013.01); *G06Q 10/10* (2013.01); *H04L 51/046* (2013.01)

(56) References Cited

U.S. PATENT DOCUMENTS

| | | | |
|---|---|---|---|
| 6,601,108 | B1 | 7/2003 | Marmor |
| 6,658,625 | B1 | 12/2003 | Allen |
| 6,941,361 | B1 | 9/2005 | Fink et al. |
| 7,076,543 | B1 | 7/2006 | Kirti et al. |
| 7,124,249 | B1 | 10/2006 | Darcy |
| 7,134,020 | B2 | 11/2006 | Eagle et al. |
| 7,376,969 | B1 | 5/2008 | Njemanze et al. |
| 7,451,103 | B1 | 11/2008 | Boyle et al. |
| 7,451,139 | B2 | 11/2008 | Namba |
| 7,555,482 | B2 | 6/2009 | Korkus |
| 7,765,181 | B2 | 7/2010 | Thomas et al. |
| 7,895,229 | B1 | 2/2011 | Paknad |
| 8,073,729 | B2 | 12/2011 | Kisin et al. |
| 2002/0143794 | A1 | 10/2002 | Helt |
| 2002/0194097 | A1 | 12/2002 | Reitz |
| 2002/0198629 | A1 | 12/2002 | Ellis |
| 2003/0154199 | A1 | 8/2003 | Thomas et al. |
| 2003/0182375 | A1 | 9/2003 | Zhu et al. |
| 2003/0200308 | A1 | 10/2003 | Tameda et al. |
| 2004/0098424 | A1 | 5/2004 | Seidenberg et al. |
| 2004/0260733 | A1 | 12/2004 | Adelstein et al. |
| 2005/0027750 | A1* | 2/2005 | Martin .................. G06Q 10/10 |
| 2005/0086720 | A1 | 4/2005 | Shimizu et al. |
| 2005/0114290 | A1* | 5/2005 | Borthakur ................ G06F 7/02 |
| 2005/0152235 | A1 | 7/2005 | Hoshizawa |
| 2005/0177527 | A1 | 8/2005 | Morris et al. |
| 2005/0216522 | A1 | 9/2005 | Gomes et al. |
| 2005/0257129 | A1 | 11/2005 | Kreiner et al. |
| 2006/0095795 | A1 | 5/2006 | Nakamura et al. |
| 2006/0167877 | A1 | 7/2006 | Lee et al. |
| 2006/0256739 | A1 | 11/2006 | Seier et al. |
| 2007/0027974 | A1 | 2/2007 | Lee et al. |
| 2007/0073894 | A1 | 3/2007 | Erickson et al. |
| 2007/0088754 | A1 | 4/2007 | Brannon et al. |
| 2007/0100978 | A1 | 5/2007 | Levi et al. |
| 2007/0112783 | A1 | 5/2007 | McCreight et al. |
| 2007/0162547 | A1 | 7/2007 | Ross |
| 2007/0203837 | A1 | 8/2007 | DiRienzo |
| 2007/0208918 | A1 | 9/2007 | Harbin et al. |
| 2007/0226170 | A1 | 9/2007 | Sun |
| 2007/0271517 | A1 | 11/2007 | Finkelman et al. |
| 2007/0288579 | A1 | 12/2007 | Schunemann |
| 2008/0027895 | A1 | 1/2008 | Combaz |
| 2008/0046260 | A1 | 2/2008 | Ghielmetti et al. |
| 2008/0061146 | A1 | 3/2008 | Komaki |
| 2008/0082672 | A1 | 4/2008 | Garrett |
| 2008/0162455 | A1 | 7/2008 | Daga et al. |
| 2008/0168145 | A1 | 7/2008 | Wilson |
| 2008/0252936 | A1 | 10/2008 | Stratton |
| 2008/0288479 | A1 | 11/2008 | Paknad et al. |
| 2008/0294492 | A1 | 11/2008 | Simpson et al. |
| 2009/0001162 | A1 | 1/2009 | Asher et al. |
| 2009/0006973 | A1 | 1/2009 | Newell et al. |
| 2009/0043819 | A1 | 2/2009 | Searl et al. |
| 2009/0076836 | A1 | 3/2009 | Arvidson et al. |
| 2009/0132262 | A1 | 5/2009 | Paknad |
| 2009/0164427 | A1 | 6/2009 | Shields et al. |
| 2009/0164522 | A1 | 6/2009 | Fahey |
| 2009/0165026 | A1 | 6/2009 | Paknad et al. |
| 2009/0183253 | A1 | 7/2009 | Kates |
| 2009/0210494 | A1 | 8/2009 | Fisher et al. |
| 2009/0286219 | A1 | 11/2009 | Kisin et al. |
| 2009/0313196 | A1 | 12/2009 | Islam et al. |
| 2010/0017239 | A1 | 1/2010 | Saltzman et al. |
| 2010/0033750 | A1 | 2/2010 | Tischler et al. |
| 2010/0082382 | A1 | 4/2010 | Kisin et al. |
| 2010/0082555 | A1 | 4/2010 | Ogawa et al. |
| 2010/0185875 | A1 | 7/2010 | Mayer et al. |
| 2010/0205020 | A1 | 8/2010 | Losey |
| 2010/0223108 | A1 | 9/2010 | Quinn, Jr. |
| 2010/0250266 | A1 | 9/2010 | Miller et al. |
| 2010/0250308 | A1 | 9/2010 | Mayer et al. |
| 2010/0250455 | A1 | 9/2010 | Richards et al. |
| 2010/0250456 | A1 | 9/2010 | Toomey et al. |
| 2010/0250459 | A1 | 9/2010 | Andersen et al. |
| 2010/0250474 | A1 | 9/2010 | Richards et al. |
| 2010/0250484 | A1 | 9/2010 | Andersen et al. |
| 2010/0250488 | A1 | 9/2010 | Mayer et al. |
| 2010/0250498 | A1 | 9/2010 | Andersen et al. |
| 2010/0250503 | A1 | 9/2010 | Andersen et al. |
| 2010/0250509 | A1 | 9/2010 | Andersen |
| 2010/0250512 | A1 | 9/2010 | Miller et al. |
| 2010/0250531 | A1 | 9/2010 | Andersen et al. |
| 2010/0250538 | A1 | 9/2010 | Richards et al. |
| 2010/0250541 | A1 | 9/2010 | Richards et al. |
| 2010/0250573 | A1 | 9/2010 | Mayer et al. |
| 2010/0250644 | A1 | 9/2010 | Toomey et al. |
| 2010/0250735 | A1 | 9/2010 | Andersen |
| 2010/0250931 | A1 | 9/2010 | Andersen et al. |
| 2010/0251149 | A1 | 9/2010 | Mayer et al. |
| 2010/0306283 | A1 | 12/2010 | Johnson et al. |
| 2011/0016138 | A1* | 1/2011 | Teerlink ................ H04L 9/0894 707/758 |
| 2011/0040600 | A1 | 2/2011 | Paknad et al. |
| 2011/0173033 | A1 | 7/2011 | Paknad et al. |
| 2012/0191500 | A1 | 7/2012 | Byrnes et al. |

FOREIGN PATENT DOCUMENTS

| | | | |
|---|---|---|---|
| WO | 0127765 | A1 | 4/2001 |
| WO | 0210967 | A2 | 2/2002 |
| WO | 0242952 | A1 | 5/2002 |
| WO | 02071192 | A2 | 9/2002 |
| WO | 03065256 | A1 | 8/2003 |
| WO | 2004092902 | A2 | 10/2004 |
| WO | 2006001833 | A2 | 1/2006 |
| WO | 2006031836 | A2 | 3/2006 |
| WO | 2006052441 | A2 | 5/2006 |
| WO | 2007044709 | A2 | 4/2007 |
| WO | 2007076515 | A2 | 7/2007 |
| WO | 2008009991 | A1 | 1/2008 |
| WO | 2008070415 | A2 | 6/2008 |

OTHER PUBLICATIONS

Great Britain Intellectual Property Office. GB Examination Report dated Apr. 23, 2012. Great Britain Application No. GB1108090.0. Name of Applicant: Bank of America Corporation. English Language. 3 pages.

Summons and Oral Proceedings issued in EP10250584.9, dated Jul. 29, 2013.

Summons and Oral Proceedings issued in EP10250591.4, dated Jul. 30, 2013.

Summons and Oral Proceedings issued in EP10250586.4, dated Jul. 30, 2013.

Summons and Oral Proceedings issued in EP10250590.6, dated Jul. 30, 2013.

Search Report and Written Opinion for Singapore Application No. 201002122-8 mailed Jan. 3, 2012.

Search Report and Written Opinion for Singapore Application No. 201002141-8 mailed Jan. 3, 2012.

Search Report and Written Opinion for Singapore Application No. 201002143-4 mailed Jan. 3, 2012.

Search Report and Written Opinion for Singapore Application No. 201002120-2 mailed Feb. 10, 2012.

Second Written Opinion for Singapore Application No. 201002126-9 mailed Mar. 14, 2012.

Second Written Opinion for Singapore Application No. 201002128-5 mailed Mar. 14, 2012.

(56) References Cited

OTHER PUBLICATIONS

Second Written Opinion for Singapore Application No. 201002129-3 mailed Mar. 14, 2012.
Second Written Opinion for Singapore Application No. 201002139-2 mailed Mar. 14, 2012.
Singapore Patent Application No. 201002126-9 Search Report and Written Opinion mailed Aug. 3, 2011.
Singapore Patent Application No. 201002129-3 Search Report and Written Opinion mailed Aug. 3, 2011.
Singapore Patent Application No. 201002128-5 Search Report and Written Opinion mailed Aug. 3, 2011.
Singapore Patent Application No. 201002139-2 Search Report and Written Opinion mailed Aug. 3, 2011.
Singapore Patent Application No. 201002137-6 Search Report and Written Opinion mailed Aug. 15, 2011.
Singapore Patent Application No. 201002138-4 Search Report and Written Opinion mailed Aug. 19, 2011.
Singapore Patent Application No. 201002125-1 Search Report and Written Opinion mailed Aug. 24, 2011.
Singapore Patent Application No. 201002134-3 Search Report and Written Opinion mailed Aug. 25, 2011.
Singapore Patent Application No. 201002124-4 Search Report and Written Opinion mailed Aug. 25, 2011.
Singapore Patent Application No. 201002142-6 Search Report and Written Opinion mailed Sep. 5, 2011.
Singapore Patent Application No. 201002144-2 Search Report and Written Opinion mailed Sep. 5, 2011.
Singapore Patent Application No. 201002140-0 Search Report and Written Opinion mailed Sep. 27, 2011.
Anonymous: "EDRM LegalTech 2009 Luncheon Presentation", E.D.R.M.—The Electronic Discovery Reference Model; Document No. XP-002601404 LegalTech Lunch & Learn, Feb. 3, 2009, LegalTech New York; Retrieved from the Internet: URL:http://edrm.net/002/wp- content/uploads/2009/09/EDRM_LegalTech.pdf [retrieved Sep. 17, 2010].
Extended European Search Report dated Sep. 23, 2010 for European Application No. EP 10 25 0587.
European Patent Office. European Office Action dated Apr. 26, 2012. European Application No. 10 250 579.9. Name of Applicant: Bank of America Corporation. English Language. 10 pages.
European Patent Office. European Office Action dated Apr. 26, 2012. European Application No. 10 250 584.9. Name of Applicant: Bank of America Corporation. English Language. 10 pages.
European Patent Office. European Office Action dated Apr. 25, 2012. European Application No. 10 250 586.4. Name of Applicant: Bank of America Corporation. English Language. 10 pages.
European Patent Office. European Office Action dated Apr. 25, 2012. European Application No. 10 250 5815. Name of Applicant: Bank of America Corporation. English Language. 10 pages.
European Patent Office. European Office Action dated Apr. 25, 2012. European Application No. 10 250 576.5. Name of Applicant: Bank of America Corporation. English Language. 11 pages.
European Patent Office. European Office Action dated Apr. 27, 2012. European Application No. 10 250 5872. Name of Applicant: Bank of America Corporation. English Language. 10 pages.
European Patent Office. European Office Action dated Apr. 25, 2012. European Application No. 10 250 577.3. Name of Applicant: Bank of America Corporation. English Language. 10 pages.
European Patent Office. European Office Action dated Apr. 25, 2012. European Application No. 10 250 580.7. Name of Applicant: Bank of America Corporation. English Language. 10 pages.
Ciravegna et al.: "User-System Cooperation in Document Annotation based on Information Extraction" 2002. Proceedings of the 13th International Conference on Knowledge Engineering and Knowledge Management.
Buchholz et al: "On the Role of File System Metadata in Digital Forensics", Journal of Digital Investigation, vol. 1(4), pp. 297-308, Dec. 1, 2004.
Golden et al. Scalpel: "A Frugal, High Performance File Carver" 2005 Digital Forensic Research Workshop (DFRWS) New Orleans, LA.
Hewlett Packard. "HP OpenView Storage Data Protector Concepts Guide." Release A.06.00. Manufacturing Part No. B6960-96001. English Language. Jul. 2006.
Berinato: "The Rise of Anti-Forensics" http/www.csoonline.com/article/print/221208. Jun. 8, 2007.
Dan Manson et al.: "Is the Open Way a Better Way? Digital Forensics using Open Source Tools", Proceedings of the 40th Hawaii International Conference on System Sciences-2007 [dated Jan. 1, 2007]; 10 pages total.
European Patent Office. European Office Action dated Apr. 25, 2012. European Application No. 10 250 590.6. Name of Applicant: Bank of America Corporation. English Language. 10 pages.
ProcessText Group, "ABC Amber BlackBerry Converter", 2008, available online: http://web.archive.org/web/20080302025411/http://www.processtext.com/abcblackberry.html.
SysTools Software, "Export Notes—Notes Email Migration Tool", 2008, available online: http://web.archive.org/web/20080201104418/http://www.exportlotusnotes.com/export-notes.
Anonymous: "EDRM LegalTech 2009 Luncheon Presentation" E.D.R.M. The Electronic Discovery Reference Model Feb. 9, 2009. Retrieved from the Internet: http://www.edrm.net/wp-contentiplugins/download-monitor/download.php? d=6.
Microsoft Corporation: "Developing Efficient Background Processes for Windows"; Jan. 20, 2009; URL:http://msdn.microsoft.com/en-us/library/windows/hardware/gg463211.aspx.
J. Barlow, L. Bean and D.D. Hott: "Employee 'Spy' Software: Should You Use It?" The Journal of Corporate Accounting & Finance, Document No. XP-002601405, pp. 7-12; Retrieved from the Internet: URL: http.11on&Finance, Document No. XP-002601405, pp. 7-12; Retrieved from the Internet: URL: http://onlinelibrary.wiley.com/10.1002/icaf.10162/abstract [retrieved on Sep. 17, 2010].
Danish Patent and Trademark Office. Singapore Examination Report mailed Mar. 15, 2012. Applicant: Bank of America Corporation. Singapore Patent Application No. 201002124-4. DKPTO SE No. SE 2012 00392y. English Language. 10 pages. Date of Examination Report: Mar. 12, 2012.
Danish Patent and Trademark Office. Singapore Examination Report mailed Mar. 15, 2012. Applicant: Bank of America Corporation. Singapore Patent Application No. 201002134-3. DKPTO SE No. SE 2012 00392v. English Language. 10 pages. Date of Examination Report: Mar. 12, 2012.
Hungarian Intellectual Property Office. Written Opinion mailed Apr. 5, 2012. Hungary Application No. 201002138-4. Name of Applicant: Bank of America Corporation. English Language. 8 pages. Date of Written Opinion: Mar. 29, 2012.
Hungarian Intellectual Property Office. Written Opinion mailed Apr. 5, 2012. Hungary Application No. 201002137-6. Name of Applicant: Bank of America Corporation. English Language. 8 pages. Date of Written Opinion: Mar. 21, 2012.
Stamerjohanns et al, "Transforming the arxiv to XML", 2008.
Examination Report for Singapore Application No. 2013046917 dated Apr. 17, 2015.
Singapore Search Report and Written Opinion for Application No. 2013046917 dated Nov. 5, 2014.
Search and Examination Report issued in SG 018989, dated Jul. 17, 2013.
Summons and Oral Proceedings issued in EP10250583.1, dated Jul. 24, 2013.
Summons and Oral Proceedings issued in EP10250589.8, dated Jul. 24, 2013.
European Patent Office. European Office Action dated Apr. 25, 2012. European Application No. 10 250 578.1. Name of Applicant: Bank of America Corporation. English Language. 10 pages.
European Patent Office. European Office Action dated Apr. 25, 2012. European Application No. 10 250 5914. Name of Applicant: Bank of America Corporation. English Language. 10 pages.
Examination Report for European Application No. 10250588.0 dated Jun. 27, 2012.

(56) References Cited

OTHER PUBLICATIONS

Second Written Opinion for Singapore Application No. 201002120-2 dated Jul. 20, 2012.
Second Written Opinion for Singapore Application No. 201002141-8 dated Jul. 20, 2012.
Second Written Opinion for Singapore Application No. 201002140-0 dated Aug. 6, 2012.
Second Written Opinion for Singapore Application No. 201002144-2 dated Aug. 6, 2012.
Summons and Oral Proceedings issued in EP10250577.3, dated Jul. 22, 2013.
Summons and Oral Proceedings issued in EP10250580.7, dated Jul. 22, 2013.
Summons and Oral Proceedings issued in EP10250582.3, dated Jul. 22, 2013.
Summons and Oral Proceedings issued in EP10250578.1, dated Jul. 22, 2013.
Summons and Oral Proceedings issued in EP10250576.5, dated Jul. 22, 2013.
Summons and Oral Proceedings issued in EP10250585.6, dated Jul. 25, 2013.
Summons and Oral Proceedings issued in EP10250579.9, dated Jul. 25, 2013.
Summons and Oral Proceedings issued in EP10250581.5, dated Jul. 25, 2013.
Summons and Oral Proceedings issued in EP10250588.0, dated Jul. 26, 2013.
Summons and Oral Proceedings issued in EP10250587.2, dated Jul. 26, 2013.
European Patent Office. European Office Action dated Apr. 26, 2012. European Application No. 10 250 583.1. Name of Applicant: Bank of America Corporation. English Language. 10 pages.
European Patent Office. European Office Action dated Apr. 26, 2012. European Application No. 10 250 585.6. Name of Applicant: Bank of America Corporation. English Language. 10 pages.
European Patent Office. European Office Action dated Apr. 26, 2012. European Application No. 10 250 589.8. Name of Applicant: Bank of America Corporation. English Language. 10 pages.

* cited by examiner

SOURCE-TO-PROCESSING FILE CONVERSION IN AN ELECTRONIC DISCOVERY ENTERPRISE SYSTEM

CROSS-REFERENCE TO RELATED APPLICATIONS

The present application is a continuation of and claims priority to U.S. non-provisional patent application Ser. No. 12/534,375, filed Aug. 3, 2009 of the same title, which, in turn, claims priority to U.S. provisional application No. 61/164,276 entitled "Electronic Discovery System" filed Mar. 27, 2009, and assigned to the assignee hereof; the content of both of which are also incorporated herein by reference in their entirety.

FIELD OF THE INVENTION

In general, embodiments of the invention relate to methods, systems, apparatus and computer program products for electronic discovery and, more particularly, file conversion of harvested electronic communication data.

BACKGROUND

Electronic discovery, commonly referred to as e-discovery, refers to any process in which electronic data is sought, located, secured and searched with the intent of using it as evidence in a legal proceeding, an audit, a securities investigation, a forensics investigation or the like. E-discovery can be carried out offline on a particular computer or it can be accomplished in a network environment.

The nature of digital data makes it extremely well-suited for investigation. In particular, digital data can be electronically searched with ease, whereas paper documents must be scrutinized manually. Furthermore, digital data is difficult or impossible to completely destroy, particularly if the data is stored in a network environment. This is because the data appears on multiple hard drives, and because digital files, even if deleted, generally can be undeleted. In fact, the only reliable means of destroying digital data is to physically destroy any and all hard drives where it is stored.

In the process of electronic discovery, data of all types can serve as evidence. This can include text, image, calendar event data, databases, spreadsheets, audio files, multimedia files, web sites and computer programs. Electronic mail (i.e., e-mail) can be an especially valuable source of evidence in civil or criminal litigation, because people are often less careful in these exchanges than in hard copy correspondence such as written memos or postal letters.

E-discovery is an evolving field that goes far beyond mere technology. It gives rise to multiple issues, many of which have yet to be resolved. For example, identifying data required to satisfy a given discovery request, locating the appropriate set of data that has been identified, and retrieving the data once it has been identified and located all pose problems in and of themselves. This is especially evident if the data that is being identified, located and retrieved comes from an evolving or disparate enterprise, such as a corporation that has experienced mergers, acquisitions, downsizing and the like. Mergers and acquisitions mean that the technology infrastructure across the enterprise may vary, at least in the interim. However, e-discovery must be able locate and retrieve data from these disparate technology infrastructure in a timely fashion, sometimes within days of when the merger/acquisition occurs.

In addition to identifying, locating and retrieving digital data, the most critical part of any electronic discovery is the preservation of data, which involves maintaining an original source copy and storing it for preservation purposes or furthering processing. This too becomes a daunting task for the enterprise system that encompasses a myriad of different technology infrastructures and the like. Therefore, a need exists to improve the identification, location, retrieval and preservation processes, especially in instances in which the enterprise system includes disparate technology infrastructures and the like.

As previously noted, e-discovery, as opposed as conventional discovery of printed materials, provides for the ability to filter or search the data so as to reduce the volume of data to only that which is relevant to the request. Such searching is typically accomplished by determining a specific date range for the request, providing key words relevant to the case and the like. Improvements in the area of searching are greatly in need to further add efficiency to the overall e-discovery process.

Once data has been retrieved, preserved and, in some instances, searched the electronic data may be reviewed by the requesting entry, such as a law firm, securities commission or the like. While large requests are generally suited for online review, the manner in which the data is presented for review adds efficiency to the review process and ultimately drives the cost of the review process. Therefore, improvements in the manner in which data is presented for review are also desirable as a means of increasing efficiency and reducing costs.

Lastly, once the digital data has been reviewed, data identified as relevant may need to be produced in a tangible format for further analysis or legal evidentiary purposes. The produced documents must be properly identified and include necessary redactions and confidentiality markings.

Up until now, e-discovery management has been conducted on a case-by-case basis, meaning all tasking and workflow related to the e-discovery is based at the case level. Such management does not allow for finer granularity in the management of a case or for links to exist between different cases for the purpose of leveraging the e-discovery related to one case to another new or pre-existing case. Therefore, a need exists to improve the manner in which cases are managed and, in particular, how tasking and workflow are managed depending on case requirements and the like.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for electronic discovery and, in particular, improvements in electronic discovery that allow for electronic discovery to be efficiently and cost-effectively employed across a diverse enterprise. In particular, embodiments herein described related to systems, apparatus, methods and computer program products for automatically converting diverse electronic communication formats to a predetermined format that can subsequently be presented to a requesting party or, more likely, readily processed downstream by a third party entry responsible for providing the requesting party access to the electronic data and, in particular, the electronic communication data. Automatic conversion of the data eliminates the need for operator intervention during the conversion process and thereby further adds efficiency to the overall electronic discovery process.

A method for electronic communication file conversion in an enterprise-wide electronic data discovery system defines a first embodiment of the invention. The method includes capturing electronic data including electronic communication files from a plurality of custodians based on a data request and, once captured storing the data in long-term storage. The method also includes copying the electronic data to a processing entry, such as a conversion server or the like. The method further includes identifying file type for one or more of the electronic communication files and automatically converting, automatically, one or more of the electronic communication files to a predetermined file format based on identification of file type. Once the electronic communication files have been converted, they are stored in long-term storage for subsequent quality control processing and/or communication to the data requesting party or a third party entity responsible for providing requesting party access to the electronic data.

According to specific embodiments of the method, the predetermined format to which the electronic communication files are converted may be a format supported by a third-party electronic data presentation entry and, more specifically, according to certain embodiments, the converted file format may be Personal Storage Table (.PST) format.

According to further embodiments of the method, identifying file type further includes identifying a mobile communication back-up file type, such as .IPD files or the like, as one of the electronic communication files. In such embodiments the method may further include extracting individual electronic communication messages from the electronic communication files identified as mobile communication back-up file type. Further, in such embodiments, converting the electronic communication files may further include converting, automatically, the electronic communication messages extracted from the mobile communication back-up file to a predetermined file format.

In another embodiment of the method, identifying file type further includes identifying Electronic Mail (.EML) file type and/or Message (.MSG) file type as one of the electronic communication file types and converting further includes converting, automatically, electronic communication files identified as .EML file type or .MSG file type to a predetermined file format, such as .PST or the like.

In yet another embodiment of the method, identifying file type further includes identifying a compression scheme file type, such as .ZIP, .RAR, .TAR or the like, as one of the electronic communication file types. In such embodiments, the method may further include extracting one or more electronic communication files from the compression scheme file and, subsequently, converting one or more of the extracted electronic communication files to a predetermined file format, such as .PST or the like.

In still further embodiments the method may include identifying one or more encrypted entries in one or more electronic communication files, such as Notes Storage Facility (.NSF) type file or the like and automatically decrypting the one or more encrypted entries. In further related embodiments the method may include converting one or more entries in the .NSF file to a third-party data presentation-supported entry format, such as a conventional message format or the like.

An apparatus for electronic communication file conversion in an enterprise-wide electronic data discovery system defines another embodiment of the invention. The apparatus includes a computing platform including at least one processor and a memory. The apparatus further includes an electronic communication file conversion module stored in the memory and executable by the at least one processor. The file conversion module is configured to receive, from storage, a copy of electronic data, including electronic communication files, captured from enterprise-wide custodians. Further the file conversion module includes a file type identification application configured to identify the file type of the electronic communication files. Additionally, the file conversion module includes one or more file type-specific conversion applications configured to automatically convert electronic communication files to a predetermined file format based on identification of the file type.

According to specific embodiments of the apparatus, the predetermined file format to which the electronic communication files are converted may be a format chosen based on support by a third-party electronic data presentation entry, the data requesting party or the like. In one such embodiment, the predetermined file format is Personal Storage Table (.PST) format or the like.

In another embodiment of the apparatus, the electronic communication file conversion module may include an electronic communication extraction application configured to extract electronic communication messages or other entries, such as appointments or the like, from electronic communication files prior to converting the electronic communication messages or entries to the predetermined file format.

In a further embodiment of the apparatus, the file type identification application is configured to identify mobile communication back-up file type, such as .IPD back-up file type or the like. In such embodiments, the electronic communication file conversion module may include an electronic communication extraction application configured to extract electronic communication messages or other entries from the mobile communication back-up file, such as an .IPD back-up file or the like. Likewise, in still further related embodiments of the apparatus one of the file-type specific conversion applications may include an .IPD conversion application configured to automatically convert the electronic communication messages or other entries extracted from the .IPD files to a predetermined file format.

In yet other embodiments of the apparatus, the file type identification application may be configured to identify Electronic Mail (.EML) file type and/or Message (.MSG) file type. In such embodiments, the file type-specific conversion applications may further include an .EML conversion application and/or an .MSG conversion application configured to automatically convert electronic communication files identified as .EML and/or .MSG to a predetermined file format.

In a still further embodiment of the apparatus the file type identification application is configured to identify compression scheme file type, such as .ZIP, .RAR, .TAR or the like. In such embodiments, the electronic communication file conversion module may further include an electronic communication file extraction application configured to extract one or more electronic communication files from electronic the compression scheme files.

In another embodiment, the apparatus includes an electronic communication decryption module configured to identify one or more encrypted entries in an electronic communication file, such as an .NSF file or the like, and to automatically decrypt the one or more encrypted entries. In such aspects, the apparatus may include one or more entry type-specific conversion applications configured to automatically convert file entry format to a predetermined entry format.

Yet another embodiment of the apparatus includes a hash verification module configured to verify integrity of the copy of electronic data.

A computer program product defines yet another embodiment of the invention. The computer program product includes a computer-readable medium. The medium includes a first set of codes for causing a computer to capture electronic data, including electronic communication files from a plurality of custodians based on a data request. The medium also includes a second set of codes for causing a computer to store the captured electronic data and a third set of codes for causing a computer to copy the electronic data to a processing entity, such as a conversion server or the like. The medium also includes a fourth set of codes for causing a computer to identify file type for the electronic communication files and a fifth set of codes for causing a computer to automatically convert one or more of the electronic communication files to a predetermined file format based on identification of file type. Additionally, the medium includes a sixth set of codes for causing a computer to store the electronic data, including the converted one or more electronic communication files.

In certain embodiments of the computer program product, the fifth set of codes is further configured to cause the computer to automatically convert one or more of the electronic communication files to a predetermined file format supported by a third-party electronic data presentation entry, a data requesting party or the like, such as .PST file format or the like.

In other embodiments of the computer program product, the fourth set of codes is further configured to cause the computer to identify a mobile communication back-up file type, such as .IPD back-up file type or the like. In such embodiments the medium may include a seventh set of codes for causing a computer to extract individual electronic communication messages or other entries from electronic communication files identified as mobile communication back-up file type. In such embodiments, the fifth set of codes may be further configured to cause the computer to automatically convert the electronic communication messages extracted from the mobile communication back-up file to a predetermined file format, such as .PST file format or the like.

In still further embodiments of the computer program product, the fourth set of codes is further configured to cause the computer to identify an Electronic Mail (.EML) file type and/or a Message (.MSG) file type for one or more of the electronic communication files and wherein the fifth set of codes is further configured to cause the computer to automatically convert electronic communication files identified as .EML file type and/or .MSG file type to a predetermined file format, such as .PST or the like.

In yet other embodiments of the computer program product, the fourth set of codes may be further configured to cause the computer to identify a compression scheme file type. In such embodiments, the medium may also include a seventh set of codes for causing a computer to extract one or more electronic communication files from electronic communication files identified as compression scheme file type. Further, the fifth set of codes may be further configured to cause the computer to automatically convert one or more of the extracted electronic communication files to a predetermined file format.

In still other embodiments of the computer program product, the medium includes a seventh set of codes for causing a computer to identify one or more encrypted entries in one or more electronic communication files, such as .NSF files or the like, and an eighth set of codes for causing a computer to automatically decrypt the one or more encrypted entries.

Thus, present embodiments provide for automatically converting electronic communication files to a predetermined format that is consistent with a format supported by a third-party designated as the provider of accessible electronic data, and/or the data requesting party and/or the like. The automated nature of the process adds efficiency to the overall electronic discovery process and insures that the eventual data requesting party is provided with accessible data.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
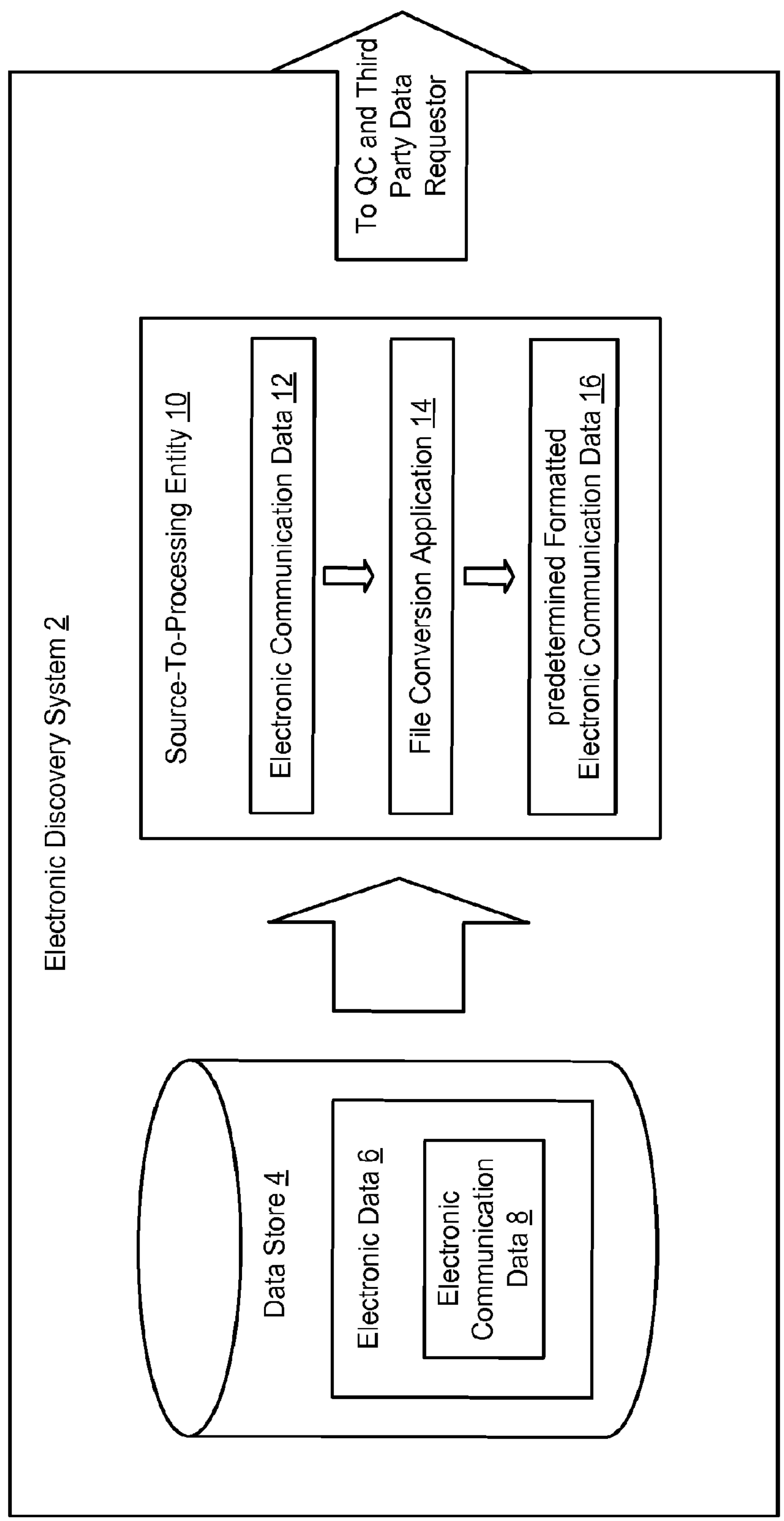
Figure 2:
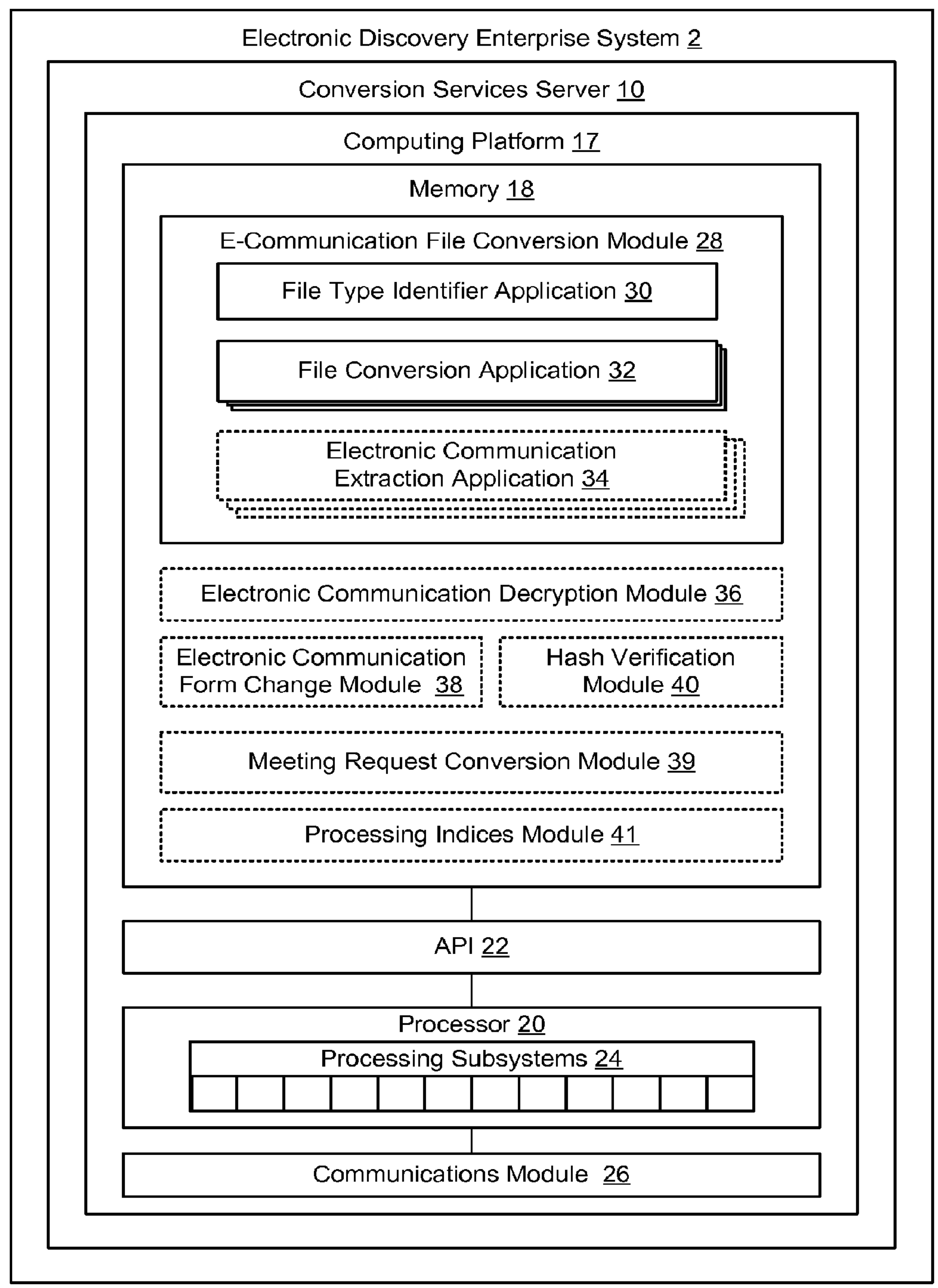
Figure 3:
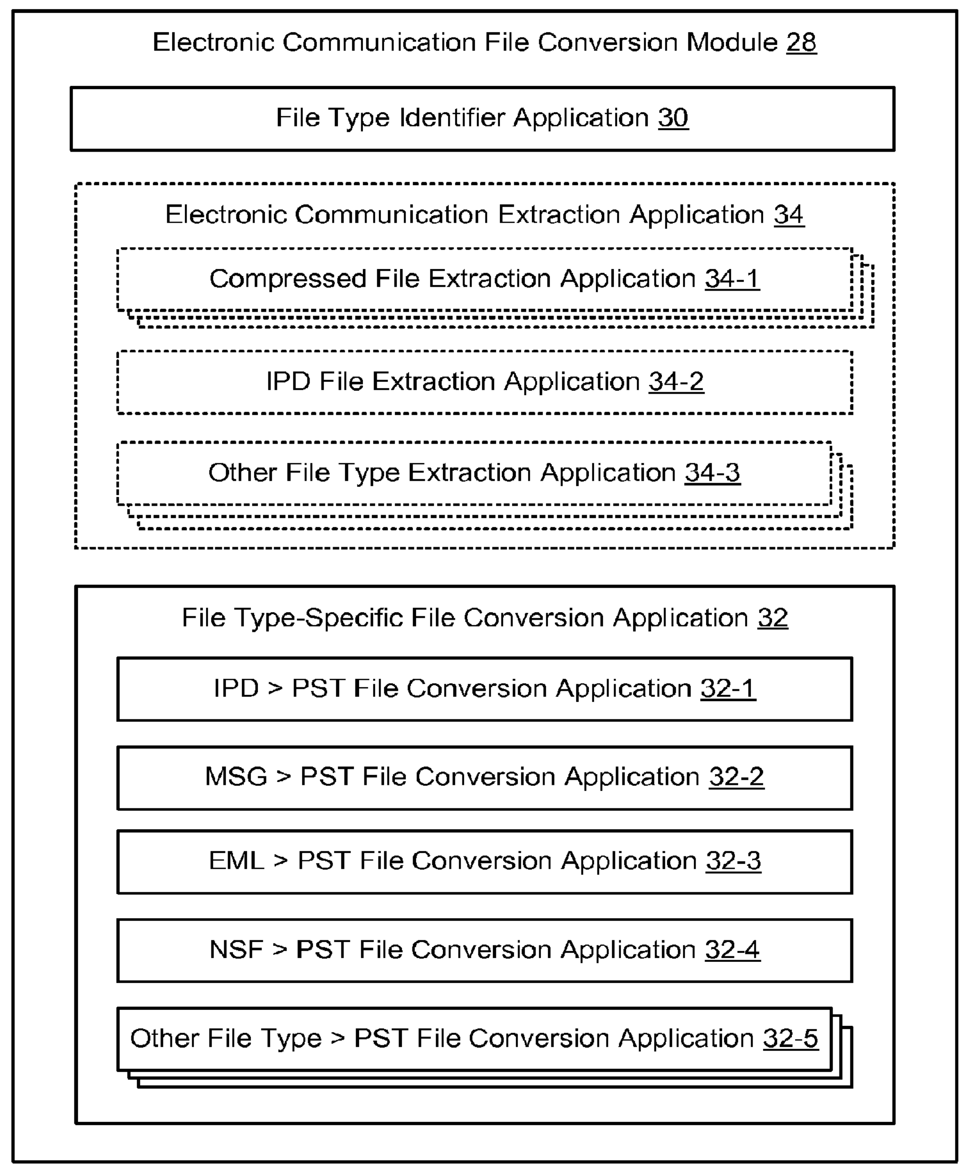
Figure 4:
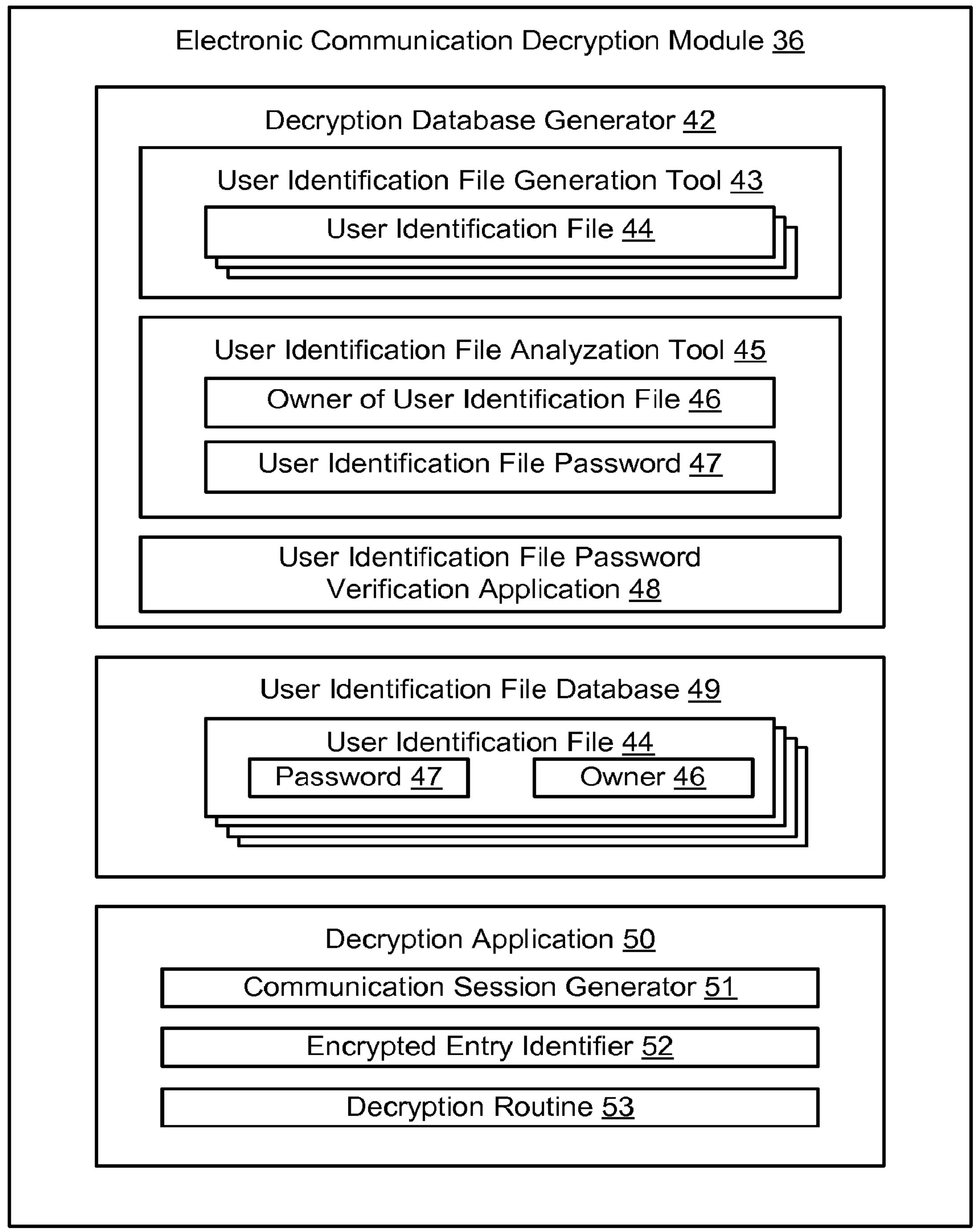
Figure 5:
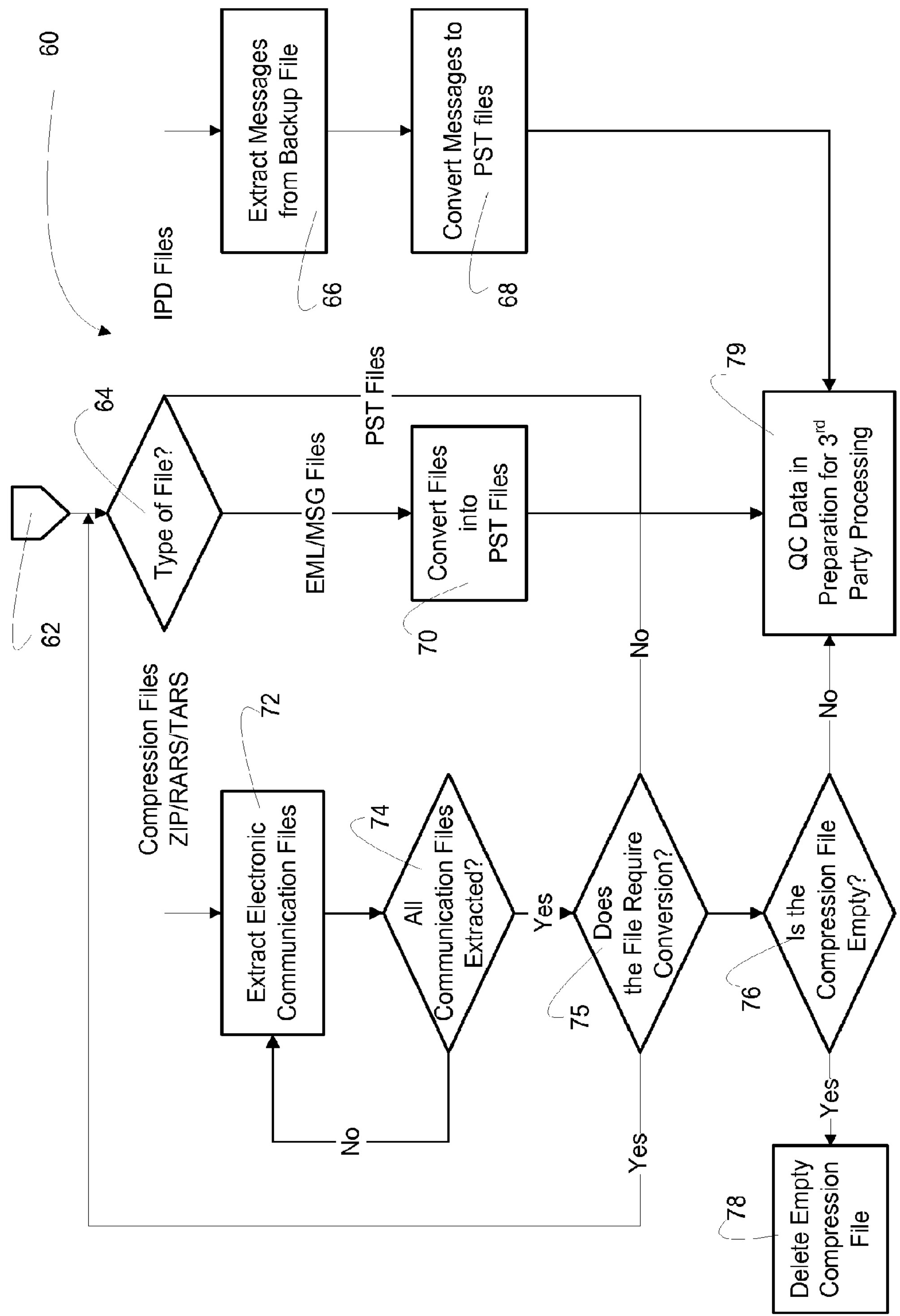
Figure 6:
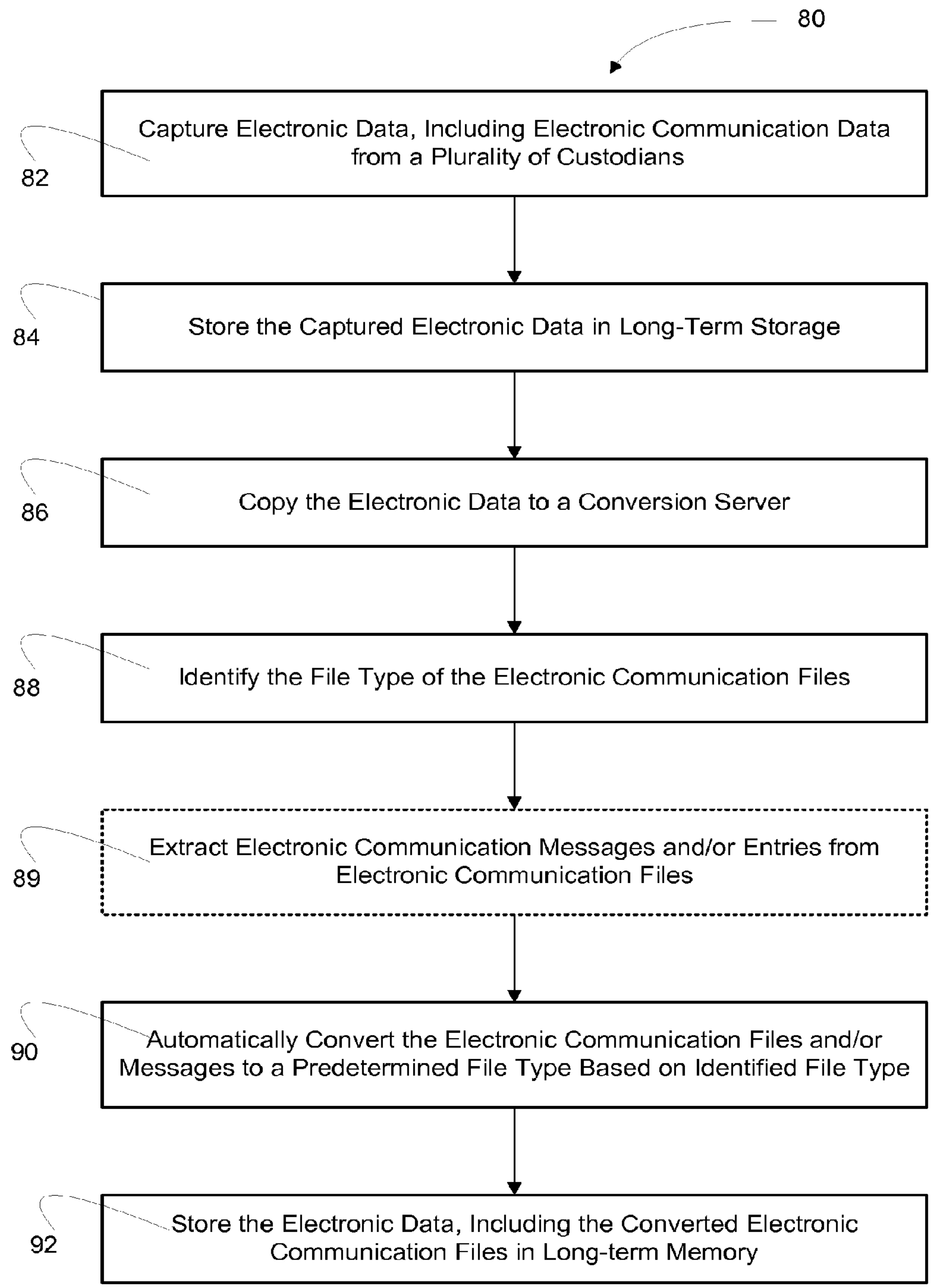
Figure 7:
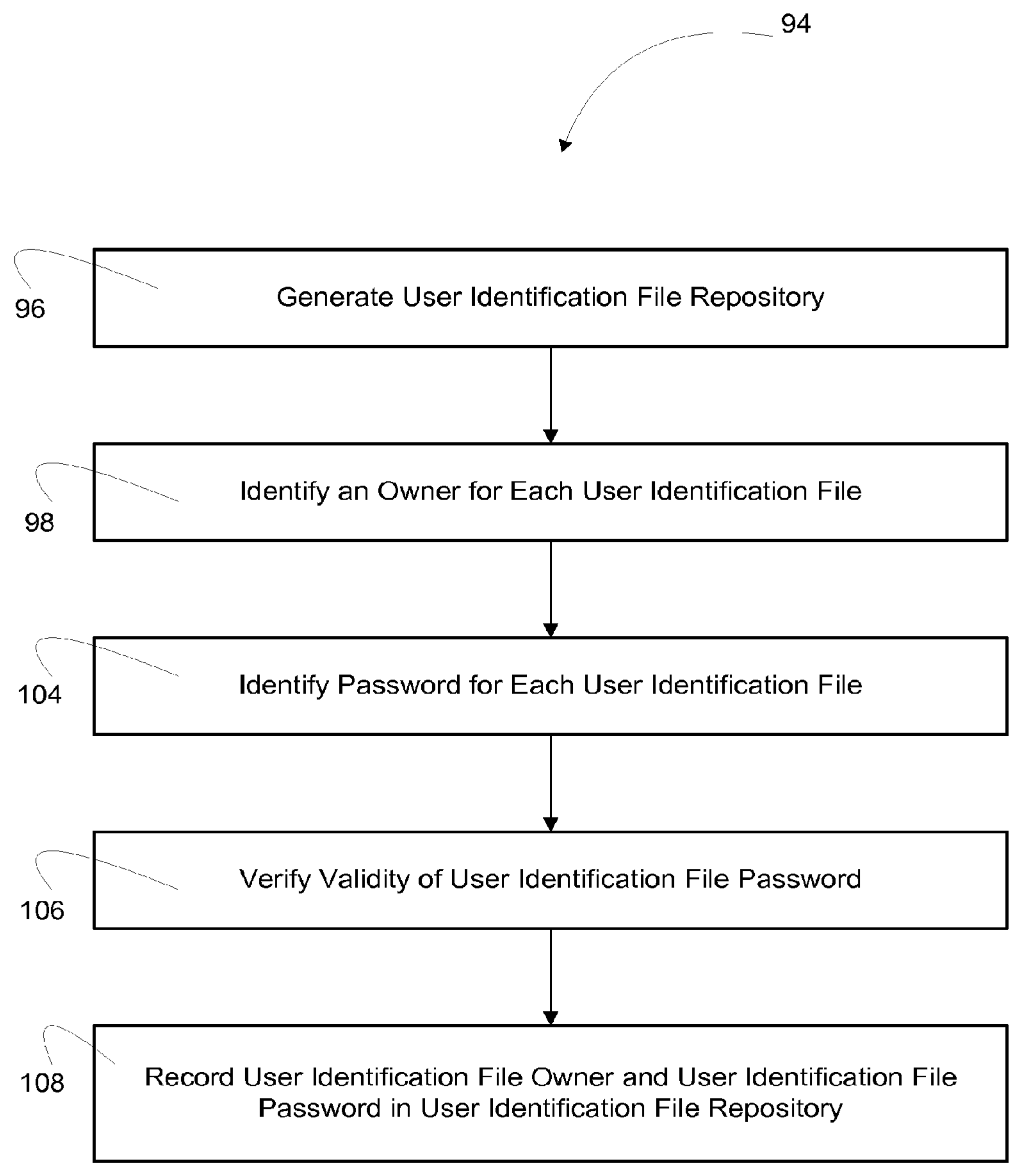
Figure 8:
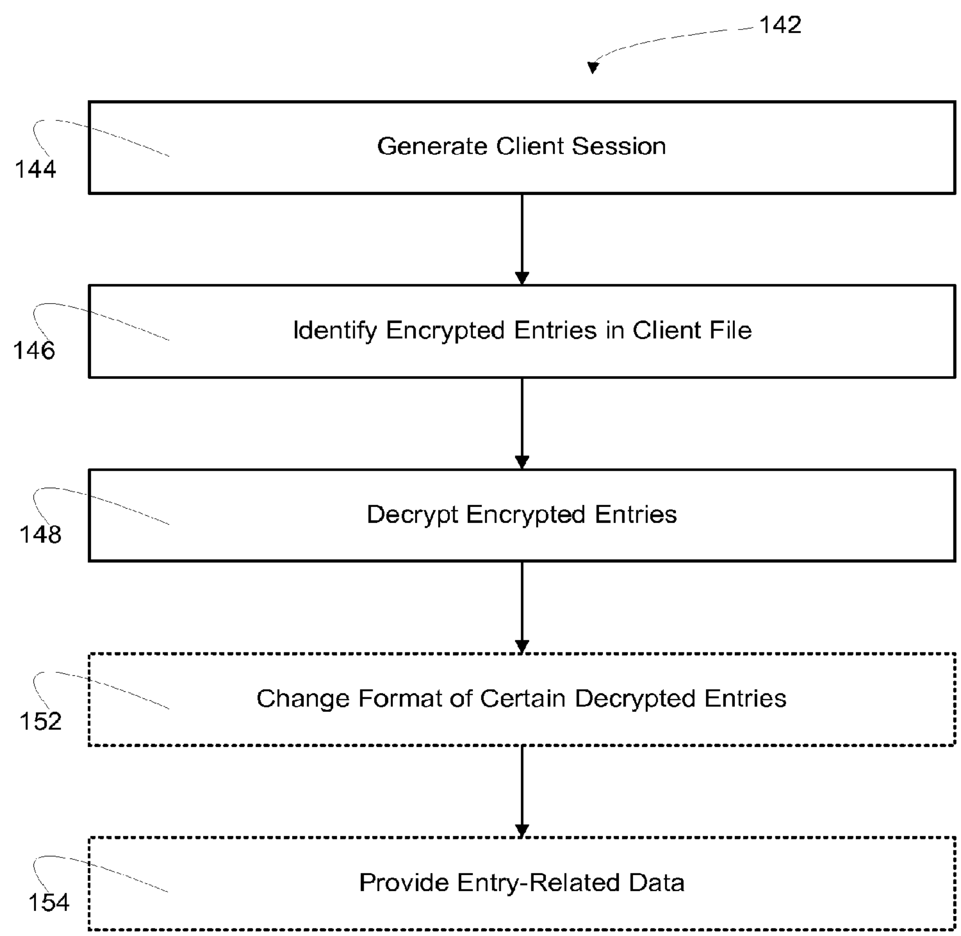
Figure 9:
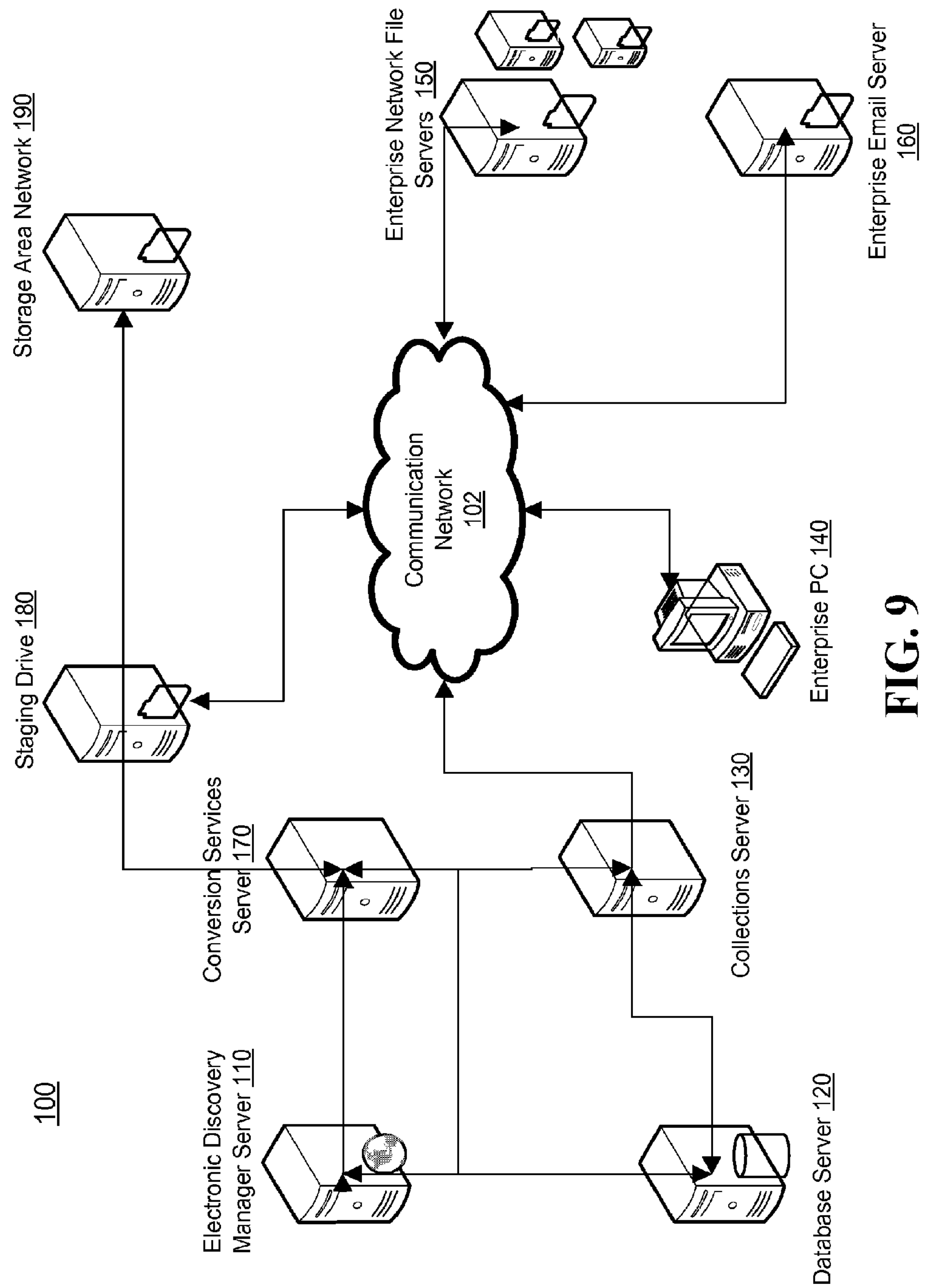
Figure 10:
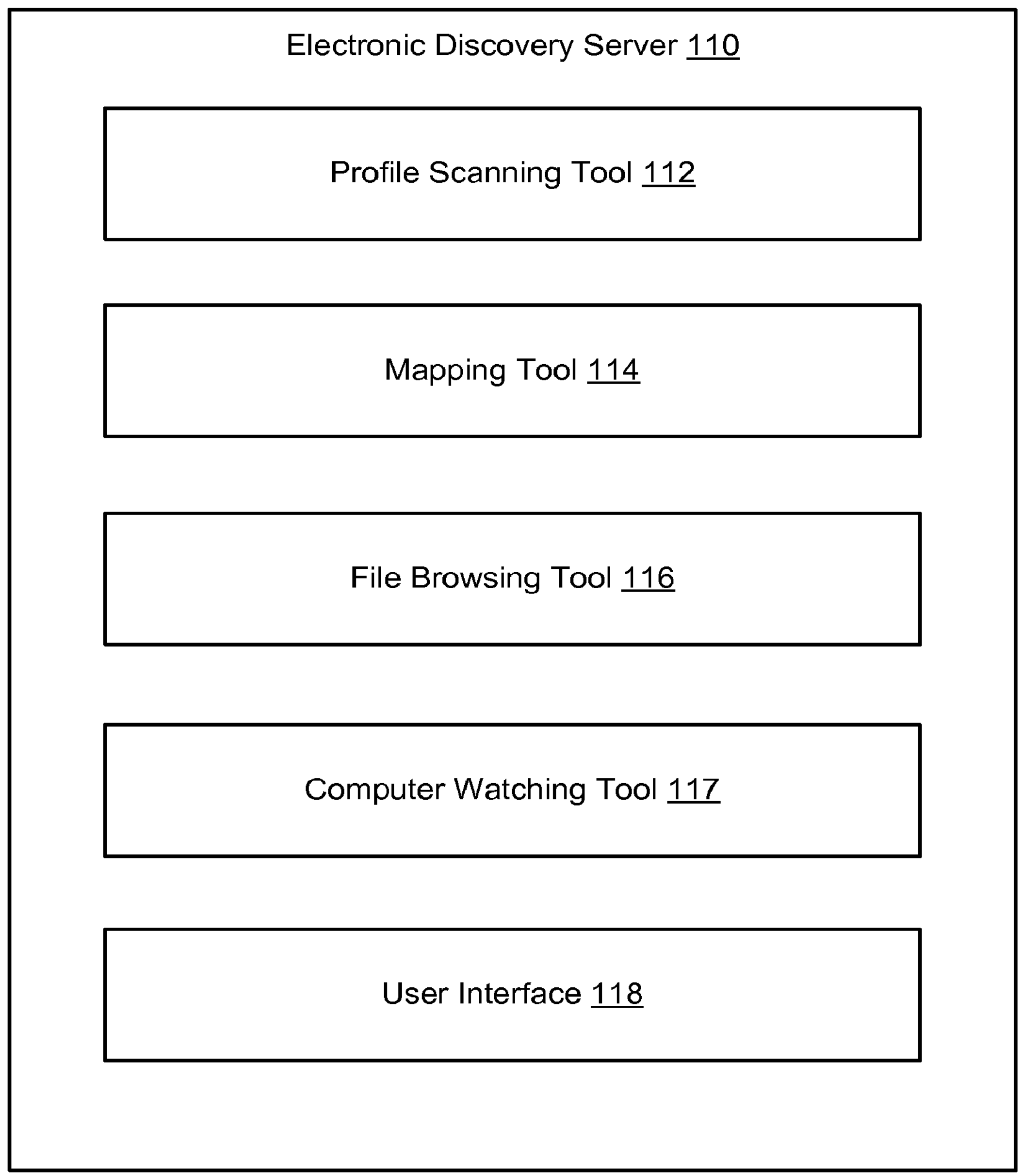
Figure 11:
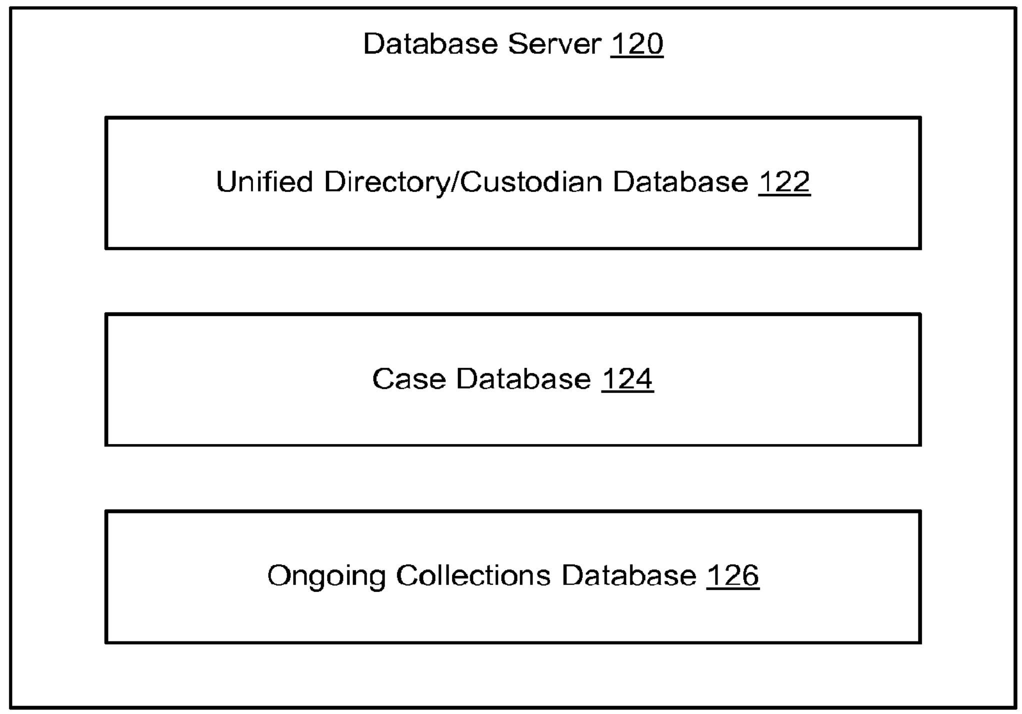
Figure 12:
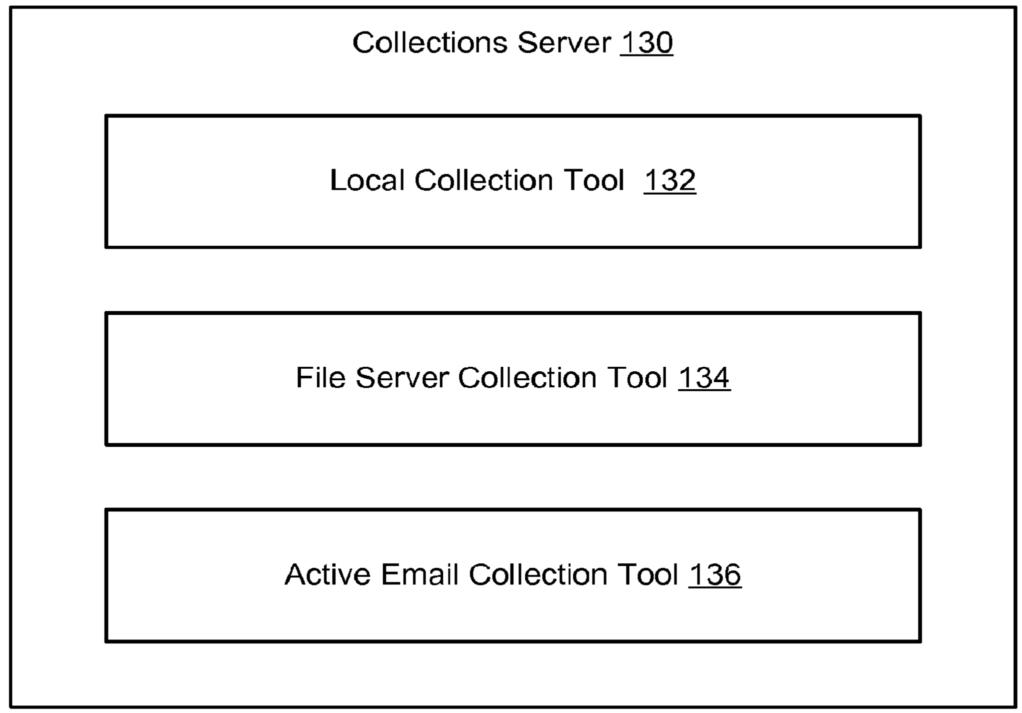
Figure 13:
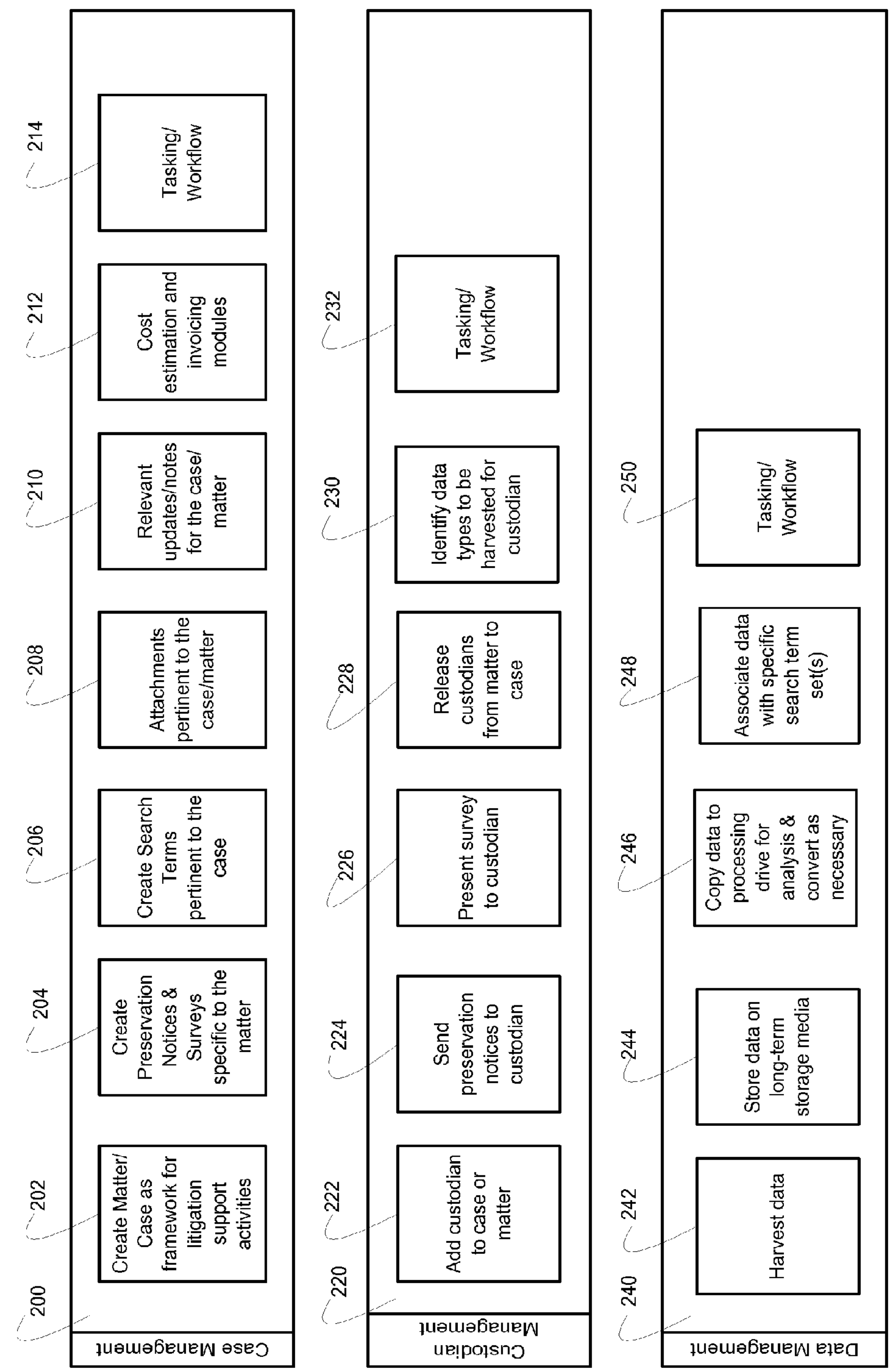
Figure 14:
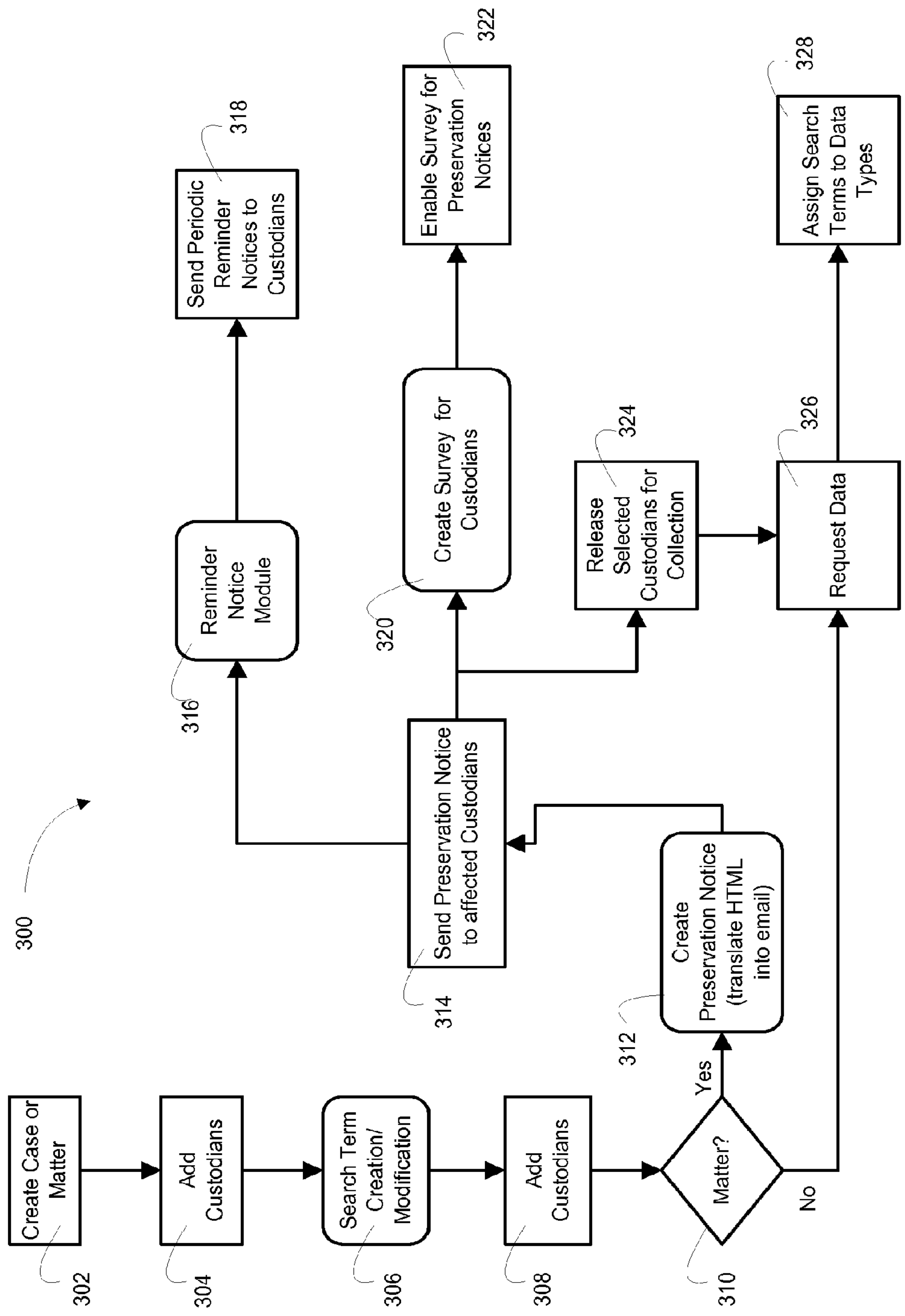
Figure 15:
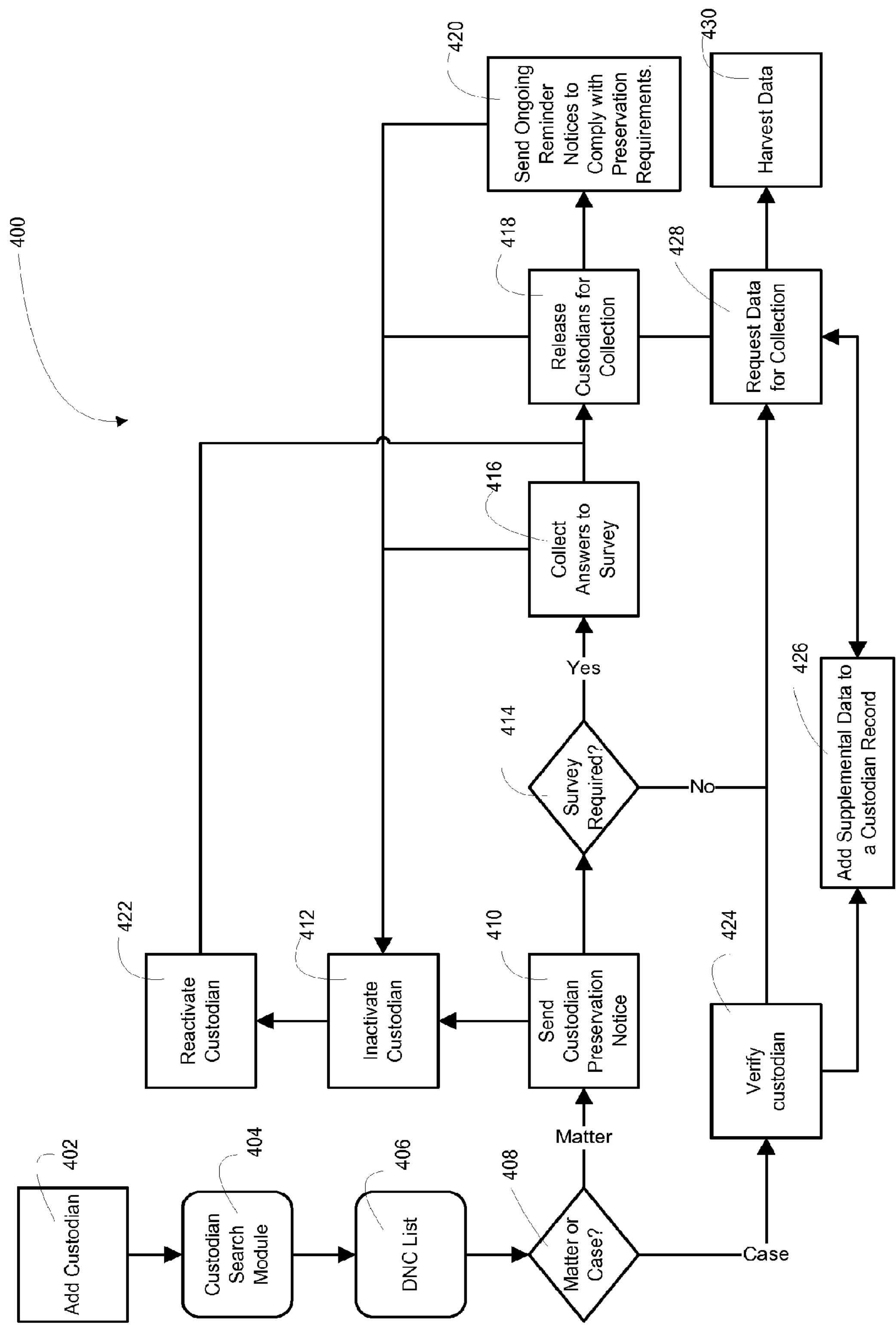
Figure 16:
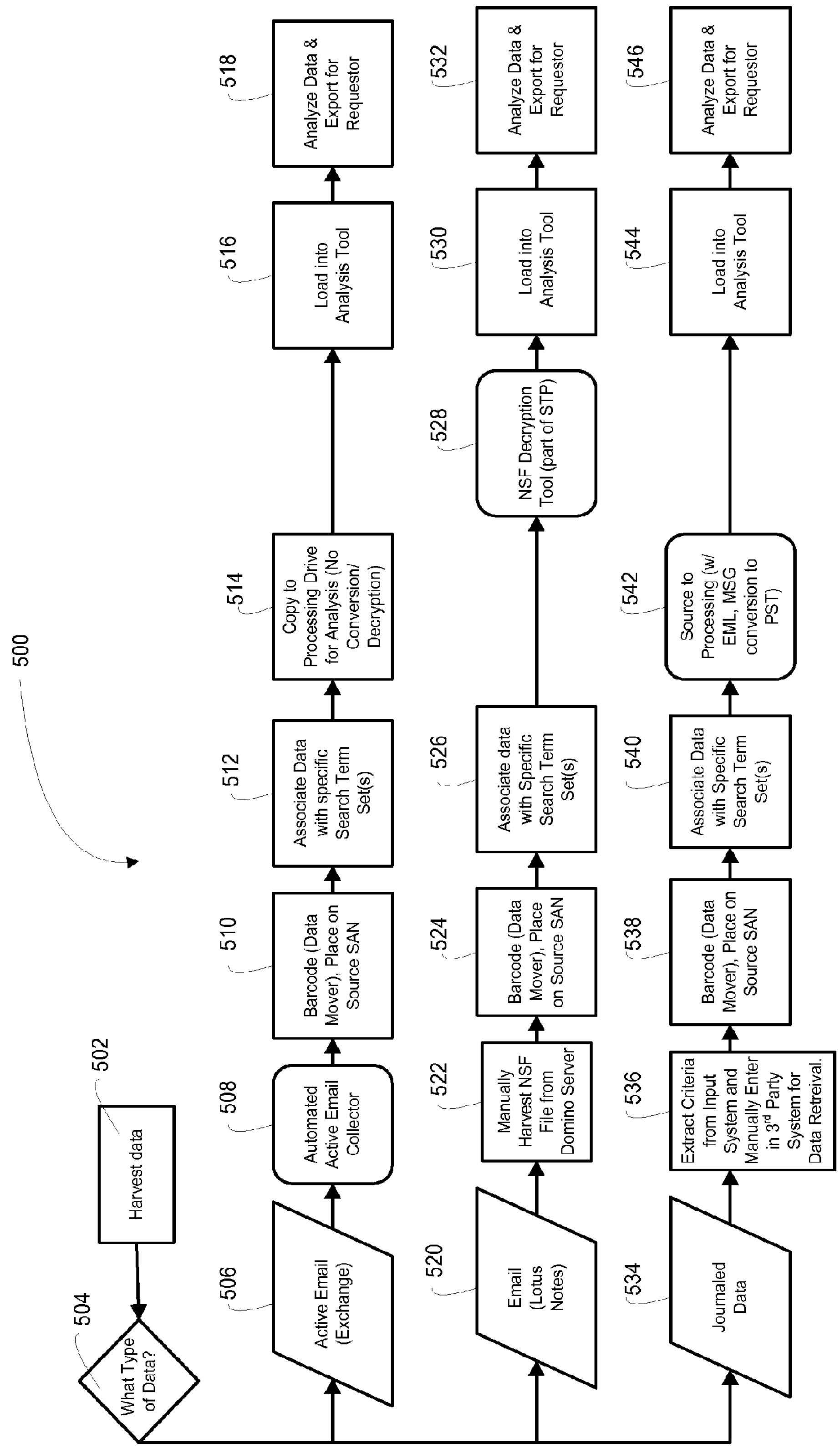
Figure 17:
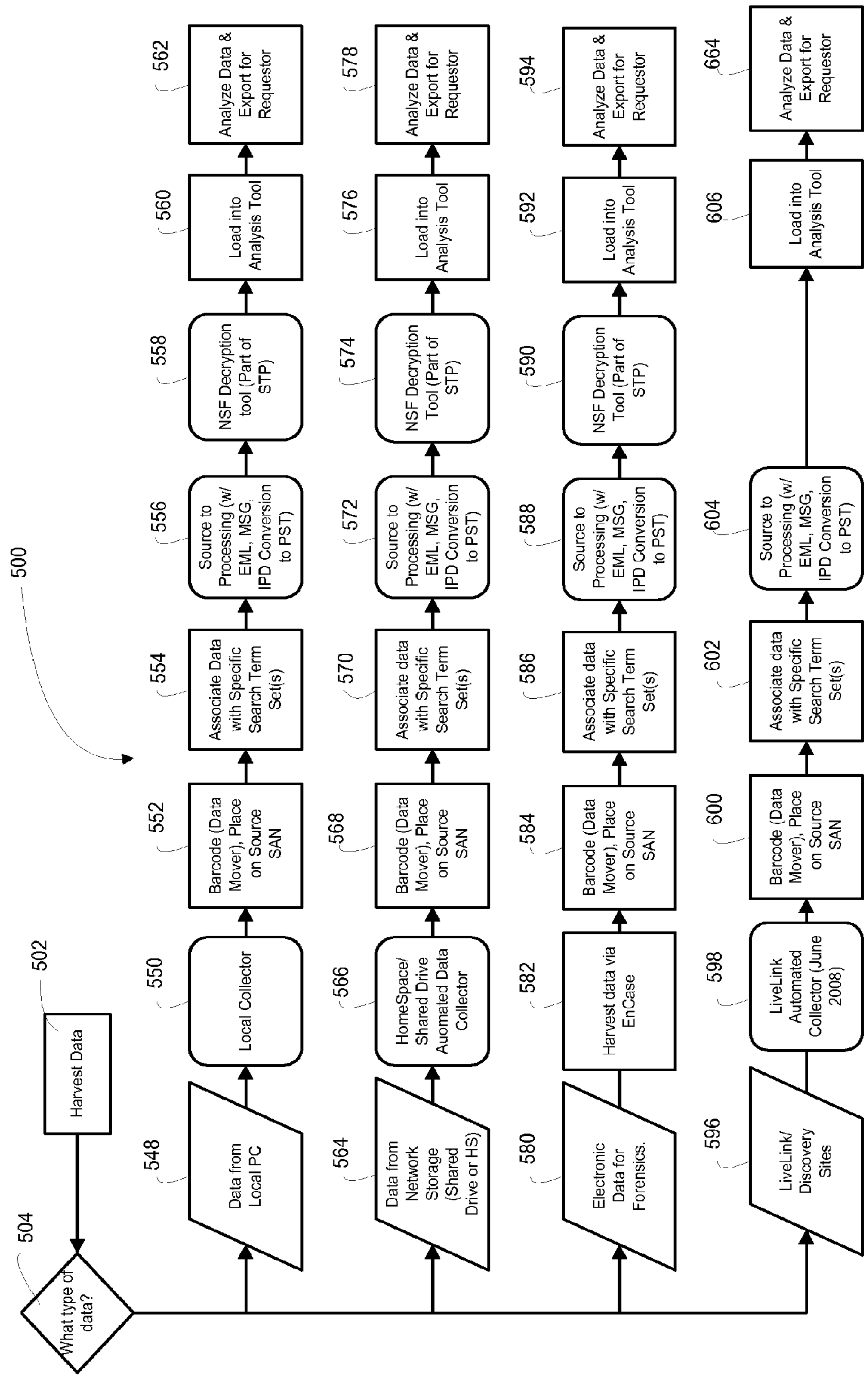

Having thus described embodiments of the invention in general terms, reference will now be made to the accompanying drawings, which are not necessarily drawn to scale, and wherein:

FIG. 1 is a block diagram of an enterprise-wide electronic discovery system highlighting source-to-processing file conversion, in accordance with embodiments of the present invention;

FIG. 2 is a block diagram of a conversion services server implemented at source-to-processing within an electronic discovery system, in accordance with embodiments of the present invention;

FIG. 3 is a block diagram of an electronic communication file conversion module, in accordance with embodiments of the present invention;

FIG. 4 is a block diagram of an electronic communication decryption module, in accordance with embodiments of the present invention;

FIG. 5 is a flow diagram of a method for source-to-processing file conversion in an electronic discovery system, in accordance with embodiments of the present invention;

FIG. 6 is a flow diagram of a method for source-to-processing file conversion in an electronic discovery system, in accordance with embodiments of the present invention;

FIG. 7 is a flow diagram of a method for generating a decryption repository for decrypting electronic communication in an electronic discovery system, in accordance with embodiments of the present invention;

FIG. 8 is a flow diagram of a method for conducting automated decryption of electronic communication files in an electronic discovery system, in accordance with embodiments of the present invention;

FIG. 9 illustrates a network environment in which the processes described herein are implemented, according to one embodiments of the invention;

FIG. 10 is a block diagram of an electronic discovery manager server, in accordance with embodiments of the present invention;

FIG. 11 is a block diagram of a database server, in accordance with an embodiment of the present invention;

FIG. 12 is a block diagram of a collection server, in accordance with an embodiment of the present invention;

FIG. 13 is block diagram illustrating electronic discovery management structure, in accordance with an embodiment of the invention;

FIG. 14 is a flow diagram of a method for initiating a case or matter including creating search terms, creating and sending preservation notices, sending reminder notices and creating and sending surveys to custodians, in accordance with embodiments of the present invention;

FIG. 15 is a flow diagram of a method for custodian management in an electronic discovery system, in accordance with an embodiment of the present invention; and FIGS. 16 and 17 are flow diagrams of methods for harvesting different data types in an electronic discovery system, in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, apparatus, systems, methods and computer program products are herein disclosed that provide efficiency in electronic data discovery and, more specifically, for electronic communication file conversion in a source-to-processing environment for the purpose of providing a standard format to a third party designated for providing access to the electronic discovery data, the data requesting part or the like.

FIG. 1 provides a block diagram of an enterprise-wide electronic discovery system 2. Embodiments of the invention herein disclosed apply to an electronic discovery system that can be implemented across diverse platforms, networks, computer systems, applications and the like to capture or otherwise harvest electronic data and properly process the data for submission to a third party provider of the data, the data requesting party or the like. The enterprise-wide nature of the electronic discovery system allows for a corporation or other entry to acquire and/or merge with other business entities having disparate platforms, networks, computer systems, applications and the like while still maintaining the full functionality of the electronic discovery system to readily and efficiently harvest electronic data and process the harvested data, accordingly.

For purposes of presently described embodiments of the invention, the electronic discovery system 2 includes a data store 4, typically a long-term data store that is configured to store data captured or otherwise harvested from, what is referred to in the art as, custodians, Custodians are individuals, a grouping of individuals or an entry identified at the onset of a case or matter whose electronic communication, such as e-mail or the like, as well as other electronic forms of data, such as word processing files and the like, are subject to capture and review. Thus, once electronic data 6, including electronic communication data 8, is captured or otherwise harvested from custodians in manners described in detail infra., the electronic data is stored in data store 4.

Once data has been captured and stored in data store 4, the electronic communication data 8 is copied to a source-to-processing entity 10, such as a conversion service server or other device suitable for data processing. At the server level the electronic communication data exists in various formats, such as compressed file format, such as .ZIP file, .RAR file, TAR file and the like; mobile communication back-up file format, such as .IPD file format; Electronic Mail (.EML) file format; Message (.MSG) file format; Notes Storage Facility (.NSF) file format and the like. In order to properly prepare the electronic communication for process production review a third party provider of a data analysis tool, such as, for example, Attenex Corporation of Seattle, Wash. or the like benefits from receiving all of the electronic communications in a standard format. Thus, source-to-processing entity 10 implements one or more file conversion applications 12 to transform or otherwise convert the electronic communication data 8 to predetermined formatted electronic communication data 14. In certain embodiments of the invention the predetermined format may be Personal Storage Table (.PST) file format. In such embodiments certain electronic communication data, such as active email files may already exist in .PST file format and, therefore, may not require conversion at the source-to-processing entity 10 level prior to release to the third party data analysis provider. The file conversion application 12 may be a single application configured to transform any and/or all format types to the predetermined format or the file conversion application 12 may include a plurality of file format-specific conversion applications configured to convert one or more format types to the predetermined format.

Once the electronic communication data undergoes reformatting at the source-to-processing entity 10, the data typically undergoes quality control processing and may be released to the third party for data analysis preparation and/or returned to long-term storage.

Referring to FIG. 2, shown is a more detailed block diagram depiction of a source-to-processing entity, such as a conversion service server 10 incorporated in the electronic discovery system 2 of the present invention. The conversion services server 10 is configured to provide for automated electronic communication file conversion to a predetermined format, in accordance with present aspects. In addition to providing greater detail, FIG. 2 highlights various alternate embodiments. The conversion services server 10 may include one or more of any type of computerized device. The present apparatus and methods can accordingly be performed on any form of computing device.

The server 10 includes computing platform 17 that can receive and execute routines and applications. Computing platform 17 includes memory 18, which may comprise volatile and non-volatile memory, such as read-only and/or random-access memory (RAM and ROM), EPROM, EEPROM, flash cards, or any memory common to computer platforms. Further, memory 18 may include one or more flash memory cells, or may be any secondary or tertiary storage device, such as magnetic media, optical media, tape, or soft or hard disk.

Further, computing platform 17 also includes processor 20, which may be an application-specific integrated circuit ("ASIC"), or other chipset, processor, logic circuit, or other data processing device. Processor 20 or other processor such as ASIC may execute an application programming interface ("API") 22 that interfaces with any resident programs, such as electronic communication file conversion module 28, electronic communication decryption module 36 or the like stored in the memory 18 of the conversion services server 10.

Processor 20 includes various processing subsystems 24 embodied in hardware, firmware, software, and combinations thereof, that enable the functionality of server 10 and the operability of the server on a network. For example, processing subsystems 24 allow for initiating and maintaining communications and exchanging data with other networked devices. For the disclosed aspects, processing subsystems 24 of processor 20 may include any subsystem used in conjunction with the electronic communication file conversion module 28, electronic communication decryption module 36, the electronic communication form change module 38, the hash verification module 40 or subcomponents or sub-modules thereof.

Computer platform 17 additionally includes communications module 26 embodied in hardware, firmware, software, and combinations thereof, that enables communications among the various components of the conversion services server 10, as well as between the other devices in the electronic discovery system 2. Thus, communication module 26 may include the requisite hardware, firmware, software and/or combinations thereof for establishing a network communication connection.

The memory 18 of computing platform 17 includes electronic communication file conversion module 28 that is configured to convert electronic communication files from various formats, such as .EML, MSG., .IPD, .NSF and the like to a predetermined standard format, such as .PST or the like, which is aligned with a third party electronic discovery data provider, the data requesting party or the like. The electronic communication file conversion module 28 includes a file type identifier application 30 that is configured to determine the file type of electronic communication files. In certain embodiments the conversion services server 10 receives a copy of all electronic data harvested, while in other embodiments the conversion services server 10 may receive a copy of all the electronic communication harvested (i.e., a subset of all the electronic data). Identification of the file type of electronic communication files may be necessary to determine if file conversion is necessary and/or which file conversion application to apply to the file, if the file conversion applications are file type-specific. As previously noted certain electronic communication files, such as active email files or the like, may currently exist in the predetermined file format, such as .PST or the like, and, therefore, may not require conversion to the predetermined file format.

The electronic communication file conversion module 28 additionally includes one or more file conversion applications 32 that is configured to automatically convert electronic communication files to a predetermined format based on received file type. In certain embodiments, the file conversion application may be a file type-specific application that is limited to conversion of one or more specific file types. In this instance the file conversion application may include a plurality of file type-specific file conversion applications. In other embodiments of the invention, a single all-inclusive file conversion application may be implemented that is capable of converting file format to the predetermined format regardless of file type. It should also be noted that the predetermined format may be more than one format. For example, in the instance that the electronic communication data is being subsequently communicated to more than one third party electronic discovery data providers and at least two of the third parties prefer the electronic discovery communication in different standard formats. In other example, a third party electronic discovery data provider may prefer certain electronic communication formats to be converted to one predetermined format, while other electronic communications formats are preferred to be converted to another predetermined format.

The electronic communication file conversion module may also include an electronic communication extraction application 34 that is configured to extract electronic communication files, electronic communication messages and/or other entries, such as appointments and the like, from compression scheme file formats, such as .ZIP, .RAR, .TAR file formats and the like. In those embodiments in which the extraction application 34 extracts individual communication messages, appointments or the like, the file conversion application is configured to automatically convert the individual communication messages, appointments or the like to the predetermined file format. In addition, other file formats, such as mobile communication back-up file format may require message extraction. For example, Blackberry® devices available from Research in Motion (RIM) of Waterloo, Ontario Canada are configured to back-up files in an .IPD file format, which may require message extraction prior to converting the files to a predetermined format.

Conversion services server 10 may also include electronic communication decryption module 36 that is configured to automatically decrypt electronic communication that is determined to be encrypted. For example, Lotus Notes®, available from IBM Corporation of Armonk, N.Y., has the capability to encrypt electronic communication in.NSF file format. More details concerning the electronic communication decryption module 36 are discussed in relation to FIG. 4, infra.

Additionally, conversion services server 10 may also include electronic conversion form change module 38 that is configured to automatically change the form of an individual message or other entry, such as an appointment or the like, to a predetermined form that is acceptable to the third party electronic discovery data provider. Form change may be necessary in certain instances if the converted file format does not properly recognize the form of the message or other entry.

In addition, conversion services server 10 may also include meeting request conversion module 39 that is configured to convert meeting request entries and meeting request response entries to meeting appointment entries. In addition, the meeting request conversion module 39 may be configured to convert task request entries to task entries. Meeting request conversion is typically performed after the electronic communication data has been converted to the predetermined format, such as .PST format or the like. As such, according to one embodiment, meeting request conversion is performed on all .PST files prior to submitting the files to the third party data analysis tool provider. Additionally, in those embodiments in which electronic conversion form change is performed, meeting request conversion is executed after completion of the form change processing. Converting meeting request entries and the like to meeting appointment entries and task request entries to task entries is beneficial when the electronic data includes journaled data. In many instances, journaled data may not maintain or otherwise recognize appointment type data.

The conversion services server 10 may also include hash verification module 40 that is configured to apply a hash algorithm to the electronic data and/or electronic communication data to verify the integrity of the data. The hash verification is typically performed upon receiving the copy of the electronic data/electronic communication data from the long-term storage unit.

In addition, the conversion services server 10 may include processing indices module 41 configured to output indices, such as number of file types, number of files undergoing format change, type of format change, number of email messages, number of other type entries, the number messages/entries undergoing form change, the type of form change, the number of email messages undergoing form change, the number of appointments undergoing form change and the like.

Turning the reader's attention to FIG. 3 a block diagram of an electronic communication file conversion module 28 is depicted, in accordance with an embodiment of the present invention. As previously noted the electronic file conversion module 28 includes a file type identifier application 30 that is configured to determine the file type of electronic communication files. Identification of the file type of electronic communication files may be necessary to determine if file conversion is necessary and/or which file conversion application to apply to the file, if the file conversion applications are file type-specific.

The electronic communication file conversion module 28 may also include one or more electronic communication extraction applications 34 that are configured to extract electronic communication files, electronic communication messages and/or other entries, such as appointments and the like, from communication files. The applications 34 may include one or more compressed file extraction applications 34-1, such as an application for extracting messages or other entries from .ZIP files, .RAR files, .TAR files or other compressed file formats. In addition, the extraction application 34 may include an .IPD file extraction application 34-2 configured to extract individual communication messages or other entries from an .IPD back-up file. Additionally, the electronic communication extraction application 34 may include other file type extraction applications configured to extract communication messages and other entries from other file type formats requiring extraction prior to conversion.

The electronic communication file conversion module 28 may additionally includes a plurality of file type-specific file conversion applications. In the illustrated example of FIG. 3, the file type-specific file conversion applications include an .IPD file to .PST file conversion application 32-1, a .MSG file to .PST file conversion application 32-2, an .EML file to .PST file conversion application 32-3, an .NSF file to .PST file conversion application 32-4 and any other file type to .PST file conversion application 32-5.

Referring to FIG. 4 a block diagram of an electronic communication decryption module in an electronic discovery system is depicted, in accordance with an embodiment of the present invention. The decryption module 36 includes a decryption database generator 42 operable to generate a database or repository of passwords, decryption keys or the like for subsequent automated decryption of encrypted electronic communication files. In the illustrated embodiment of FIG. 4 the decryption module is configured to decrypt encrypted Lotus Notes® Notes Storage File (.NSF) files, although in other embodiments decryption of other encrypted file types is also possible. Thus, the decryption database generator 42 is configured to generate a user identification file database, such as an ID file database 49 and identify and associate an ID file owner and a password with each file in the ID file database. As such, decryption database generator 42 includes a user identification file generation tool 43, such as an ID file generation tool or the like, that is configured to automatically generate a user identification file database 49, such as an ID database or the like. In one embodiment, the user identification file generation tool 43 scans desktop hard drives, laptops and the like, enterprise-wide or a portion of the enterprise for user identification files 44, such as ID files or the like, to build a user identification file database 49, such as an ID file database or the like, or, in other embodiments, the user identification file generation tool 43 may retrieve user identification files 44 from a designated server or file share, if such a user identification file database exists.

Decryption database generator 42 also includes a user identification file analyzation tool 45, such as an ID file analyzation tool, that is configured to automatically analyze the user identification files, such as ID files to deduce an owner for each user identification file 44 and password for each user identification file 44. In one embodiment of the invention, the owner of the user identification file is identified by parsing the user identification file to identify data relevant to ownership. In certain embodiments, the owner of the file may be deduced based on the name of the file, while in other embodiments the owner of the file may be deduced by comparing the relevant parsed data to various enterprise databases and backtracking to human resources type data to identify the owner. In certain embodiments, the user identification file password may be deduced based on the name of the file, while in other embodiments the user identification file password may be brute force deciphered.

The user identification file password verification application 48, such as an ID file password verification application or the like, is configured to verify the identified password by passing/testing the identified password on a given user identification file. If the verification application is successful, the password 47 and the owner 46 are automatically recorded as entries in the user identification file 44 within the user identification file database 49.

The decryption module 36 also includes a decryption application 50 that is configured to automatically decrypt encrypted electronic communication messages and/or other entries. It should be noted that the decryption application will typically be implemented prior to converting the file or messages to a predetermined file format. In the illustrated embodiment of FIG. 4 the decryption application 50 is used in conjunction with the user identification file database 49 and, as such, is configured to decrypt encrypted file, such as Lotus Notes® .NSF files or the like. In other embodiments, the decryption application 50 may be configured to decrypt other encrypted file types. The decryption application 50 includes a communication session generator 51 that is configured to automatically generate a communication session, such as a Lotus Notes® session based on a selected ID file. The decryption application 50 also includes an encrypted entry identifier 52 that is configured to open a file including entries, such as an .NSF, which is associated with the ID file, and identify the encrypted messages or other encrypted entries in the file. Once the encrypted files have been identified, the decryption routine 53 is implemented to decrypt the entries using the user identification file and, moreover, the password identified for the user identification file in the decryption database generator 42.

FIG. 5 is a flow diagram of a method 60 for electronic communication source-to-processing file conversion, in accordance with embodiments of the present invention. At Event 62, electronic communication data is copied to a source-to-processing entity, such as a conversion services server or the like. At Event 64, the type of file is identified. If the type of file is one that will not require conversion, such as an active email file or the like, which may already be in the predetermined format, such as .PST file format or the like, no file conversion processing is undertaken and, at Event 79, the files that are received in the predetermined format, such as the .PST file format, undergo quality control processing prior to return to long storage and/or submission to the third party data analysis tool preparation source. If the files are identified as .IPD back-up files, at Event 66, message and/or other entries are extracted from the .IPD file. Once the individual messages are extracted, at Event 68, the messages and/or other entries are converted to a predetermined format, such as .PST file format or the like. At Event 79, the converted .PST file is forwarded for quality control processing prior to submission to third party data analysis tool preparation.

If the files are identified as .EML or .MSG files, at Event 70, the files are converted to a predetermined file format, such as .PST file format or the like.

If the files are identified as a compression scheme file, such as .ZIP files, .RAR file, .TAR file or the like, at Event 72, electronic communication files are extracted from the compressed files. At Event 74, a determination is made to determine if all of the communication files have been extracted from the compressed file. If it is determined that not all of the communication files have been extracted from the compressed file, the process returns to Event 72 for further communication file extraction processing. If it is determined that all of the communication files have been extracted from the compressed file, at Event 75, a determination is made whether each communication file extracted from the compression file requires a conversion. Certain files extracted from the compression file may already be in the predetermined format, such .PST format or the like and, thus, do not require conversion processing.

If it is determined that one or more of the extracted files require conversion then the process returns to Event 64, which identifies the type of file format for each of the files requiring conversion extracted from the compressed file and processes the files accordingly. Thus, if the files extracted from the compressed file are .EML or .MSG files they are converted to the predetermined file format and, if the files extracted from the compressed file are .IPD files, messages and/or other entries are extracted from the .IPD file and the messages and/or other entries are converted to the predetermined format. At Event 79, the converted .PST file is forwarded for quality control processing prior to submission to third party data analysis tool preparation. If it is determined that one or more of the extracted files do not require conversion, at Event 79, the files not requiring conversion undergoes quality control processing prior to submission to third party data analysis tool preparation or the like.

Additionally, once it is determined that all of the communication files have been extracted from the compressed file and conversion decisions have been made for all the extracted file, at Event 76, a determination is made as to whether the compressed file is empty. If the compressed file is empty, meaning no other files other than communication files were present in the compressed file, at Event 78, the empty compression file is deleted. If the compression is determined to not be empty, at Event 79, it is forwarded for quality control processing prior to submission to third party data analysis tool preparation.

Turning the reader's attention to FIG. 6 a flow diagram is depicted of a method 80 for electronic communication file conversion in an electronic discovery system, in accordance with embodiments of the present invention. At Event 82, electronic data that includes electronic communication data, such e-mail, appointment/calendar data and the like is captured or otherwise harvested from custodians. For more detailed example of a process for capturing and harvesting electronic data from custodians see the description related to FIGS. 9-17. At Event 84, the captured electronic data is stored in long-term storage or the like.

At Event 86, the electronic data is copied to a processing drive, such as a conversion services server or the like, for analysis, conversion and/or, in some embodiments, decryption. At Event 88, the file type of the electronic communication files is identified. File types may include, but are not limited to, .PST files, .EML files, .MSG files, .IPD files, .NSF files, compression schemes that may contain electronic communication files, such as .ZIP files, .RAR files, .TAR files and the like.

At optional Event 89, individual electronic communication messages (i.e., emails or the like) or other entries are extracted from electronic conversion files that warrant such prior to conversion. For example, mobile communication back-up files, such as .IPD back-up files may require electronic communication message extraction prior to converting the contents of the file to a predetermined file format.

At Event 90, the electronic communication files and/or the electronic communication messages/entries are automatically converted to a predetermined file format, such as .PST or the like based on the identified file type. The identified file type may indicate whether the file type requires conversion. For example, if the identified file type is equivalent to the predetermined file type, conversion is not warranted. Such may be the case if the predetermined file format is .PST and active emails are harvested in .PST files. Additionally, in those embodiments in which file type-specific conversion applications are implemented, the identification of the file type serves to indicate which conversion application should be applied to convert the file or files to the predetermined file type.

At Event 92, the electronic data including the converted electronic communication files is stored in long-term storage prior to undergoing quality control processing and subsequent communication to a third party electronic data analysis tool provider.

Referring to FIG. 7 a flow diagram is presented of a method 94 for creating a decryption repository, in accordance with an embodiment of the invention. The described embodiment is generally implemented in conjunction with decrypted.NSF files, although in other embodiments of the invention a decryption repository may be constructed in similar fashion. At Event 96, a user identification file repository/database, such as an ID file repository/database is generated. The ID file repository may be generated by scanning desktop/laptop hard drives that exist in the enterprise system or, if ID files are stored in a known location, the ID files may be retrieved from servers and/or file shares. At Event 98, an owner identity is identified for each of the user identification files. The owner of the user identification file may either be deduced from the name of file or through file analysis. In those instances in which file analysis is used to identify the owner, the file may be parsed for relevant information and using various databases in conjunction with the relevant information backtrack to human resources databases or the like to identify the owner of the user identification file.

At Event 104, a password is identified or otherwise deciphered for each of the user identification files. In certain embodiments, the password may be identified intuitively or using a brute force means of deciphering the password. In one embodiment, the password may be intuitively deduced based on the name given to the user identification file (i.e., the ID file name contains the password or the password can be readily derived from the ID file name). At Event 106, the validity of the password is verified by testing the derived password on a given user identification file to determine if the password is successful in rendering the encryption/decryption keys in the associated user identification file. Once the validity of a password has been determined, at Event 108, the password and the file owner are recorded in the associated user identification file of the user identification file repository/database, such that subsequent decryption using the user identification file can be performed automatically based on the information provided in the user identification file.

FIG. 8 provides a flow diagram of a method 142 for automated decryption of electronic communication in an electronic discovery system; in accordance with embodiments of the present invention. Once a file containing encrypted entries and the associated user identification file, such as an ID file or the like, have been selected, at Event 144, a client session is created. For example, in the instance in which the encrypted entries are contained in an .NSF file, a Lotus Notes® file is created based on the ID file. At Event 146, the encrypted entries in the file, such as an .NSF file or the like are automatically identified and, at Event 148 the encrypted entries are automatically decrypted using the appropriate decryption key. As previously discussed in relation to FIG. 7, according to one embodiment of the invention, a decryption repository may be constructed that associates user identification files, such as ID files or the like, with a deciphered password and file owner. The password is retrieved from the user identification file and used to render the encryption/decryption key.

At optional Event 152, certain entries in an .NSF file or the like that require a change of form undergo form change. By changing the form type the files and/or entries are more easily reviewable and can be processed internally prior to submission to the third party electronic discovery data provider. At optional Event 153, entry-related indices are provided. The indices may be related to all communications and/or entries or may be limited to only those entries that have undergone form change. The indices may include but are not limited to, the number of messages/entries in the file, the number of messages/entries that have undergone form change, the type of form changes applied, the number of electronic mail communications, the number of electronic mail communications that have undergone form change, the number of appointment/calendar entries in the file, the number of appointment/calendar entries that have undergone form change and the like.

As a means of providing an overview of a composite, enterprise-wide electronic discovery system, which may be implemented in conjunction with the source-to-processing processes described above, FIGS. 9-17 are herein provide and described in detail. It should be noted that the system shown and described in relation to FIGS. 9-17 are by way of example only and, as such, presently described embodiments of the invention may be embodied within other electronic discovery systems or only implement select portions of the electronic discovery system herein described.

FIG. 9 illustrates an exemplary electronic discovery system 100 in accordance with an embodiment of the invention. In some embodiments, the environment of the electronic discovery system 100 is the information technology platform of an enterprise, for example a national or multinational corporation, and includes a multitude of servers, machines, and network storage devices in communication with one another over a communication network. In particular, an electronic discovery management server 110, at least one database server 120, a collections server 130, enterprise personal computers 140, enterprise file servers 150, including at least one personal network storage area and at least one shared network storage area, enterprise email servers 160, a conversion services server 170, a short-term staging drive 180, and a long-term network storage network 190 are all in communication over a communication network 102. The communication network 102 may be a wide area network, including the Internet, a local area network or intranet, a wireless network, or the like.

As shown in the block diagram of FIG. 10, the electronic discovery management server 110 provides user interface management for via user interface 118. In some embodiments, the electronic discovery management server 110 is a web server that can be accessed via a web browser. In one particular embodiment, the electronic discovery management server 110 is an intranet website server that may be accessed utilizing a web browser on a machine within the enterprise. Through the electronic discovery management server 110, the user interface 118 may be presented to a user for the purposes of managing the electronic discovery process and all processes described herein that are inherent thereto. For illustrative purposes, it may be assumed herein that the primary user interacting with the user interface 118 is an employee or contractor of the company who serves an electronic discovery management role, and hereafter is referred to as the "e-discovery manager." As discussed in greater detail below, the e-discovery manager may utilize the user interface 118 to manage cases, custodians, collections, and collected data. It should be appreciated, however, that any individual could use the user interface 118 to perform the manual functions herein attributed to the e-discovery manager, and, indeed, that an automated process could perform those functions as well.

Referring again to FIG. 9, the electronic discovery management server 110 is in communication with the database server 120 and the collections server 130 via the communication network 102. The database server 120, as shown in the block diagram of FIG. 11, is configured to provide database services for the electronic discovery management server 110, including housing the Unified Directory/custodian database 122, which includes data relating to individual custodians, the case database 124, which includes data relating to particular cases, and ongoing collections database 126, which includes data relating to collections being undertaken by the collections server 130. Each of the foregoing databases within the database server 120 is discussed in detail below. It should be understood that multiple database servers could be employed instead of a single database server, and reference to a single database server is for illustrative and convenience purposes only. For example, the Unified Directory 122 could be stored in one database server and the ongoing collections data 126 could be stored in another database server.

Regardless of the number of database servers employed, it is an object of embodiments of the present invention that data relating to custodians and cases be stored in the database server 120 independently. While custodian data in the Unified Directory 122 and case data in the case database 124 may be linked or correlated within the database server 120, for example, when custodians are assigned to particular cases, custodians may be managed separately from cases. Therefore, when a case is initialized and a custodian is assigned to the case, information for that custodian (such as data storage locations for that custodian) is accessed by the electronic discovery management server 110 in the Unified Directory 122 in the database server 120 and linked to the particular case, rather than manually input by the e-discovery manager into the case.

Furthermore, in addition to separating (but allowing linkage of) custodian management and case management processes, and as discussed further below, data management processes relating to the collection of data from custodian storage locations during electronic discovery are also separated from case management and custodian management processes. In this regard, the data collected from a particular custodian is stored separately from both the custodian information and any relevant case information (as discussed below, it is stored in long-term network storage network 190), but is linked to a custodian, which is in turn linked to one or more cases. This is advantageous because in the event a particular custodian is assigned to multiple cases, data collected from the custodian may be shared with the other case(s) to which the custodian is assigned. Therefore, the various processes and components of the electronic discovery system 100 may be categorized within one of case management, custodian management, or data management. And even though cases, custodians, and collected data may all be managed separately, there are necessarily links between the various datastores to allow management of the overall electronic discovery process.

Custodian

With regard to custodian management, according to some embodiments of the present invention, the Unified Directory/custodian database 122 houses information relating to all potential custodians within the enterprise and the locations where those custodians store data. The information stored in the Unified Directory 122 may include for a particular custodian, for example, the custodian's name, position, human resources identifier (a unique number for each employee of the enterprise), employment location, domain, email addresses, network user identification, personal computer(s) name, paths of network storage devices used by the custodian, including Shared Drives and HomeSpaces, work history, related persons (such as managers, team members or subordinates), and any other information that may be relevant to the discovery process. Since the human resources identifier is always unique for each custodian, in some embodiments, the Unified Directory 122 may be organized around the human resources identifier. All of the information relating to how the Unified Directory 122 is generated is a multi-step process that utilizes multiple tools and methods of identifying relevant information.

For example, the electronic discovery management server 110 or the database server 120 may interface with the computer databases of the human resources computer systems of the enterprise to copy the information from the human resources databases into the Unified Directory 122.

In some embodiments, the electronic discovery management server 110 may also reach out to a network directory, such as Windows Active Directory, to identify network resources related to particular custodians and integrate this information into the custodian entries including the copied human resources information. Information for the Unified Directory 122 may also be obtained from the managers of the information technology network, i.e., those individuals responsible for setting up email accounts for custodians and managing the various file servers of the enterprise. Furthermore, in addition to retrieving information in the manners described above, in some embodiments, information in the Unified Directory 122 is generated through tools initialized and/or deployed by the electronic discovery management server 110. In particular, in some embodiments, as shown in FIG. 9, a profile scanning tool 112, and a mapping tool 114 are provided.

The profile scanning tool 112 may be deployed by the electronic discovery management server 110 and is configured to crawl the communication network 102, scan each of the enterprise personal computers 140, and transmit to the database server 120 identifying information about each computer, such as computer name and IP address, and a list of all profiles, including demographics information, (or network user identification) associated with each computer. According to different embodiments, the profile scanning tool 112 may be run on the electronic discovery management server 110, the collection server 130, or another server in the communication network 102. In some embodiments, the profile scanning tool 112 is further configured to identify and transmit to the database server 120 the most recent date and time at which a particular profile was logged on to the machine. When information relating to a particular computer is received by the database server 120, the database server 120 uses the profile information, which may include several user identifications, to link the particular computer to the custodians in the Unified Directory 122 associated with those user identifications. The database server 120 may also record in each custodian's entry in the Unified Directory 122 the last time the computer was accessed by the custodian, according to the profile information transmitted by the profile scanning tool 112. Thus, the profile scanning tool 112 ultimately generates a list of personal computers used by each custodian, and this list may be presented to the e-discovery manager when a collection of a custodian's local machine(s) is initialized, as discussed in detail below.

In accordance with some embodiments of the invention, the mapping tool 114 is configured to crawl the communication network 102 and examine the enterprise file servers 150 residing on the communication network 102 to locate and identify the path of any personal network storage area on each server. As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." According to different embodiments, the mapping tool 114 may be run on the electronic discovery management server 110, the collection server 130, or another server in the communication network 102. In some embodiments, the mapping tool 114 is a Windows service that is scheduled to execute through use of Windows Scheduled Task. As the mapping tool 114 crawls the communication network 102, it is configured to examine each file server and transmit to the database server 120 the path of any network storage area within the plurality of servers 134 that it positively identifies as a HomeSpace. In some embodiments, the mapping tool 114 is configured to explore the enterprise file servers 150 by obtaining and reviewing the directories on each server and evaluating the paths of each network storage area therein, including folders and other storage devices and resources.

With regard to identifying a particular network storage area as a HomeSpace, according to some embodiments, the mapping tool 114 is configured to utilize conventional naming techniques for paths in the communication network 102 to identify those paths of network storage areas within the enterprise file servers 150 that include an indicator, based on the conventional naming techniques, that the particular storage areas associated with those paths are accessed and used by only one user, and are therefore HomeSpaces. In accordance with some embodiments of the invention, each user of the communication network 102 is assigned to at least one user identification and those user identifications are the indicators that the mapping tool 114 attempts to locate within paths when identifying HomeSpaces. In such embodiments, it is the convention that the paths of HomeSpaces on the communication network 102 include the user's user identification. On the other hand, paths of shared network storage areas do not include user identifications. Therefore, the mapping tool 114 may explore the directories of each server within the plurality of servers, evaluate each path in turn, and make a determination as to whether or not the path includes a user identification.

If it is determined that the path includes the designated indicator, for example, a user identification, the mapping tool 114 is configured to positively identify the particular network storage area identified by that path as a HomeSpace and transmit to the database server 120 the particular user identification and the path of the HomeSpace. When that information is received by the database server 120, the database server 120 uses the user identification to link the particular HomeSpace to the custodian in the Unified Directory 122 associated with that user identification. In some embodiments, the mapping tool 114 is also configured to recognize and transmit, and the database server 120 is configured to house, an indication of the last time the HomeSpace was accessed by the particular user, for example, the last time any data was read from and/or written to the HomeSpace. Additionally, in some embodiments, the mapping tool 114 is configured to recognize when multiple paths map to the same network storage area. The collection server 130 compares paths for the same user to determine if duplicative entries exist. This advantageously enables avoidance of multiple collections of the same data. Thus, the profile scanning tool 112 ultimately generates a list of HomeSpaces used by each custodian, and this list may be presented to the e-discovery manager when a collection of a custodian's HomeSpaces is initialized, as discussed in detail below.

In addition to storing a list of personal computers and HomeSpaces used by a particular custodian, which lists were generated by the profile scanning tool 112 and the mapping tool 114 respectively, in accordance with some embodiments of the present invention, the database server 120 is also configured to store a list of any shared network storage areas used by the custodian. As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." The user interface 118 is configured to receive a path of a Shared Drive input by the e-discovery manager and store the path in the Unified Directory 122 in relation to one or more custodians' human resources identifier(s). More particularly, in some embodiments, once a particular user of the communication network 102 is chosen for the collection process, the e-discovery manager may undertake to identify the particular shared network resources that that individual is using, and eventually, the paths associated with those shared network resources. This may be accomplished through conversations with the particular individual, by utilizing data returned from the local collection tool 132 executed on collection server 130 (shown in the block diagram of FIG. 12) deployed to the particular user's machine (as discussed in detail below), and/or by utilizing a file browsing tool 116 executed on electronic discovery manager server 110 (as shown in FIG. 10).

According to some embodiments of the present invention, the file browsing tool 116 is configured to be utilized by the e-discovery manager through the user interface 118. The file browsing tool 116 gives the e-discovery manager elevated authority within the communication network 102 to access, in a limited manner, the enterprise file servers 150 within the communication network 102. While the file browsing tool 116 may not allow access to the actual files stored on certain file servers, it allows the e-discovery manager to browse through the directories of the file servers 150, locate files that have been accessed by the custodian, and determine the size of the files. In accordance with some embodiments, the e-discovery manager may initially have a general idea of a particular file server within the enterprise file servers 150 that the custodian has used in the past. For example, the custodian may communicate to the e-discovery manager a particular folder name and/or drive name on which he/she has stored files. Additionally, in some embodiments, the e-discovery manager may have already undertaken a local collection process on the custodian's machine, wherein the local collection tool 132 returned a list of the network resources that the user of that machine has used. In that event, the e-discovery manager may be aware of the particular drive referenced by the user. The e-discovery manager may then employ the file browsing tool 116 to browse out to the particular drive mentioned, scan the folders for any folder having a name resembling that name given by the user, identify any particular files created by and/or accessed by the user, determine the size of such files, and retrieve the path of any folder (or Shared Drive) including data belonging to the user.

The retrieved paths of the Shared Drives may then be added, either manually or automatically, to the Unified Directory 122 in the database server 120. Thus, the Unified Directory 122 may store in connection with one custodian (and in particular in relation to the custodian's human resources identifier) a list of the personal computers, HomeSpaces, and Shared Drives associated with that custodian. Each of these locations is a potential source of data stored by the custodian, and once an investigation or collection of a custodian is initiated, the location information stored in the Unified Directory 122 may be accessed to determine the particular storage locations that need to be addressed during the investigation/collection. This is advantageous as it allows a completely automated investigation/collection process, rather than relying on the e-discovery manager to manually input the targeted machines and file servers at the time of collection.

It should be noted that the Unified Directory 122 may be regularly or continuously updated as new information is gathered using the tools described herein. More particularly, the electronic discovery management server 110 may be configured to automatically retrieve data from the human resources databases and Active Directory and any other relevant sources, such as information technology directories or lists, as well as deploy the profile scanning tool 112 and the mapping tool 114, at regularly scheduled intervals. Alternatively, rather than periodically retrieving data from the various data sources such as the human resources databases, the system 100 may be configured such that the database server 120 is continuously interfacing with the data sources such that the Unified Directory 122 is updated in real-time as the data within the data sources change. In either instance, each of the feeds of information into the Unified Directory 122 is regularly updated to ensure that the data in the Unified Directory 122 is current.

In some embodiments, the database server 120 is configured such that all historical data relating to a custodian is stored in relation to that custodian's human resources identifier in the Unified Directory 122. Thus, when the feeds of information into the Unified Directory 122 are updated, in the event data relating to the custodian has changed, the database server 120 is configured to store in the Unified Directory 122 the new data and any relevant metadata, including, for example, the time and date of the change, as well as maintain a record of the old data so that it is still a part of the custodian's profile in the Unified Directory 122. For example, in the event the profile scanning tool 114 identifies a new personal computer associated with a custodian and one of the personal computers associated with the custodian previously is no longer identified, the database server 120 is configured to store in the Unified Directory 122 the information for each computer, as well as indications as to when the new computer was first identified and when the old computer was no longer identified. In this way, the custodian profile within the Unified Database 122 may include a history of the personal computers used by the custodian. Such information may be relevant at the time of investigation or collection of the custodian.

One feed of information into the Unified Directory 122 which is particularly relevant to electronic discovery is employment status. According to some embodiments, when the feed of information from the human resources databases to the Unified Directory 122 includes a change as to employment status of a particular custodian, the electronic discovery management server 110 is configured to recognize the change and possibly perform particular functions in response. More specifically, in the event it is recorded in the Unified Directory 122 that the employment status of a particular custodian changes from active to terminated, the electronic discovery management server 110 is configured to determine whether the custodian is assigned to any case or matter, and, if so, to transmit to the designated manager or contact for the case or matter an electronic communication notifying the manager of the terminated status and inquiring as to whether the manager would like the terminated custodian's data collected. In the event the manager responds in the affirmative, the electronic discovery management server 110 is configured to automatically initiate the various collection processes of the present invention. Therefore, the custodian's data may be advantageously collected prior to any destruction or unavailability that could be caused by the termination. Alternatively, in other embodiments, the electronic discovery management server 110 may not communicate with the manager and may automatically initiate collection upon recognizing a change in employment status.

Case

With regard to case management processes, according to some embodiments, a case may be initialized by the e-discovery manager utilizing the user interface 118. In this regard, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager), custodians, etc. The electronic discovery management server 110 is configured to store this information in the case database 124 in the database server 120. The case database 124 is configured to house this information such that all information relating to a particular matter or case is related within the case database 124 and a user can use the user interface 118 to view a profile of the matter or case including all the information.

Once the matter and/or case has been initialized, the e-discovery manager may add custodians to the matter or case. In some embodiments, the electronic discovery management server 110 is configured to add numerous custodians to a single matter or case at one time. In this regard, the e-discovery manager may use the user interface 118 to enter in identifying information about the custodians. The identifying information for each custodian does not have to be of the same type. For example, a name may be entered for one custodian, an email address for another, a network user identification for another, and a human resources identifier for another. The user interface 118 is configured to receive the identifying information in different input areas depending upon the type of identifying information being received. The electronic discovery management server 110 is configured to use the input information to search the Unified Directory 122 in the database server 120 to determine which custodians are associated with the input information. In the case of a human resources identifier being entered, only one custodian in the Unified Directory 122 may be a match. On the other hand, in the case of a name being entered, multiple custodians may be a match.

The electronic discovery management server 110, after searching the Unified Directory 122 with the input identifying information, is configured to present through the user interface 118 a list of all custodians matching the input identifying information. In the event only one match was returned for a particular set of input identifying information, the electronic discovery management server 110 is configured to automatically select the custodian to be added to the case or matter. On the other hand, in the event more than one match was located for a particular set of input identifying information, then the multiple matches may be presented together to the e-discovery manager through the user interface 118 and marked so that the e-discovery manager must review the multiple custodian profiles associated with the matches to determine the correct custodian that should be added to the case or matter. In doing so, the e-discovery manager may consider the other information in the profiles, such as corporate title, work location, associated custodians, etc. Such information can inform the e-discovery manager as to whether the located custodian is the one intended. The e-discovery manager may then select the correct custodian for addition to the case or matter and confirm that all custodians selected may be added to the case or matter. According to some embodiments, "adding" a custodian to a case or matter involves linking correlating the custodian profile in the Unified Directory 122 to the case or matter in the Case database 124.

According to some embodiments, upon adding custodians to a matter, the electronic discovery management server 110 is configured to initiate the transmission of preservation notices and surveys to the custodians. In this regard, preservation notices and surveys relevant to the particular case or matter are stored in or linked to the case profile in the case database 124. Transmission of the preservation notices and surveys to custodians added to the case may be automated, for example, there may be preset instructions within the case profile that cause the electronic discovery management server 110 to transmit a particular preservation notice and survey at a particular date or time or upon a particular triggering event, such as a custodian being added to the case, or the e-discovery manager may manually cause the preservation notices and surveys to be transmitted. In some embodiments, the electronic discovery management server 110 is configured to transmit the preservation notices and surveys via a standard email function. The surveys may be tied to the preservation notices such that they are transmitted to custodians together, and one survey may be tied to more than one preservation notice. When a custodian responds to a survey, the survey response is received by the electronic discovery management server 110 and stored in relation to the relevant custodian in the case profile in the case database 124. Furthermore, the electronic discovery management server 110 may be configured to store all or a portion of the data received in the survey response in the Unified Directory 122 in the custodian's profile.

According to some embodiments, each transmission of a preservation notice and survey to a custodian, and each corresponding response, is tracked in the relevant case profile in the case database 124. The electronic discovery management server 110 may also be configured to transmit reminder notices if responses to the surveys are not received within a predefined period of time. The electronic discovery management server 110 may also be configured to schedule reminder notices to be sent to custodians to periodically refresh the custodians' memory of their duty to preserve files/documents pertaining to the matter. In some embodiments, once a preservation notice has been sent to a custodian, the electronic discovery management server 110 may undertake to prevent any reimaging or refreshing of the custodian's personal computer(s) by transmitting an alert of the preservation notice to the enterprise's information technology management group. In addition, the survey responses received from custodians serve to inform the collection process. For example, one survey may inquire as to what network storage devices the custodian uses when storing data. The answer that the custodian gives to the survey may inform the addition of Shared Drives to the custodian profile in the Unified Database 122 that may be used later in collection.

According to some embodiments of the present invention, the e-discovery manager may utilize the user interface 118 to add attachments, notes, tasks, and search terms to a case or matter. In some embodiments, the contacts/managers for a case may also access the case profile in the case database 124 using a web browser and may add attachments, notes, tasks, and search terms to be stored therein. Thus, the e-discovery manager may not be the only entry with access to the case and case management tools of the electronic discovery management server 110. The subject matter of the attachments, notes and tasks could be anything relevant to the case or matter. In some embodiments, the tasks are tasks that particular custodians must complete and the electronic discovery management server 110 is configured to transmit a notice to the custodians that that the task needs to be completed, perhaps using standard email functions. With regard to attachments, the e-discovery manager, or the contact/manager of the case, may upload relevant files to be attached to the case profile.

With regard to the search terms, the e-discovery manager or the case contacts or managers may add certain terms to the case profile to be applied when searching the collected data to locate data responsive or relevant to the underlying issues in the case. Storing the search terms within the case profile is advantageous as it creates a record of the searching that is to be undertaken with respect to the data and aids in organization of the data, as discussed further below.

According to some embodiments of the present invention, when a decision is made that it is time to collect from certain custodians in a matter, the e-discovery manager may use the user interface 118 to release the custodians from the matter to the underlying case. This release triggers the commencement of collection of the custodians' data. In some embodiments, the electronic discovery management server 110 is configured to allow all custodians assigned to the matter to be released to the case at the same time. In addition, in instances where the e-discovery manager has previously created groups of custodians within the case, the electronic discovery management server 110 is configured to allow a group of custodians to be released from a matter to a case at the same time.

Data

Once a custodian has been identified for collection, whether manually by the e-discovery manager or by being released from a matter to a case, the electronic discovery system 100 is configured to automatically collect the custodian's data using the location information stored in the Unified Directory 122. Therefore, the electronic discovery management server 110 accesses the custodian profile of the custodian to be collected in the Unified Directory 122 and determines, from the information stored therein, the different locations of data storage for the particular custodian that must be collected. There are many different locations that the system 100 can address, including personal computers, email accounts, and network storage areas, including HomeSpaces and Shared Drives.

If a custodian profile (for a custodian released for collection) includes at least one personal computer(s) associated with the custodian, then the electronic discovery management server 110 may undertake to collect the files on these machines. Therefore, the electronic discovery management server 110 may retrieve the relevant machine identifying information, such as domain, name, IP address, etc., and may initialize deployment of a local collection tool 132 running on collections server 130 (as shown in FIG. 12).

The local collection tool 132 is configured to be deployed from the collections server 130 or another server within the network 102 to any of the enterprise personal computers 140. Therefore, for a particular custodian, the local collection tool 132 is configured to utilize the machine identifying information supplied by the electronic discovery management server 110 to be deployed to the identified custodian computer. According to one embodiment, the local collection tool 132 is configured to be automatically installed on the target custodian's personal computer. The local collection tool 132 is further configured to generate a snapshot of the data residing on the local storage of the personal computer 140, for example, by using a commercially available tool such as the Volume Shadow Copy Service, store the snapshot in a storage area on the personal computer, and transmit copies of the files included in the snapshot to the collections server 130. By transmitting the data from the snapshot of the data stored on the hard drive of the personal computer, the local collection tool 132 advantageously allows the custodian to continue to use her machine without substantial interference from the local collection tool 132 and even interact with the data stored on the hard drive as the snapshot of the data is being transmitted to the collections server 130.

In addition to the functions described above, the local collection tool 132 may also be configured to transmit to the database server 120 a catalog of the files included in the snapshot to be stored in the ongoing collections database. This catalog may be referenced by the collections server 130 in order to determine whether collection is complete and to resume interrupted collections at the point of interruption. Additionally, in accordance with some embodiments, the local collection tool 132 is configured to compile and transmit to the electronic discovery management server 110 a list of network resources the user is using, including, for example, network applications and file servers that the user has used or accessed. This list of resources may be stored in the database server 120 in the custodian's profile in the Unified Directory 122. With regard to transmission of the files themselves, according to one embodiment of the invention, the local collection tool 132 is configured to compress, hash, and upload the files included in the snapshot to the collections server 130.

In some embodiments, the electronic discovery management server 110 may utilize a computer watching tool 117 to determine when to attempt a collection from a custodian's machine. The computer watching tool 117 is configured to monitor the network 102 and determine which of the enterprise personal computers 140 are online. Therefore, in the event there is a custodian whose local machine needs to be collected, the computer watching tool 117 is configured to determine when that machine joins the network 102 (i.e., when it appears to the computer watching tool 117) and inform the electronic discovery management server 110 that it should initialize the local collection tool 132 immediately.

If a custodian profile (for a custodian released for collection) includes any paths for HomeSpaces or Shared Drives, then the electronic discovery management server 110 may undertake to collect the files from these file servers by initializing the file server collection tool 134 running on collection server 130 (as shown in FIG. 12). The file server collection tool 134 is configured to access the file server located at the given path, whether the file server is a HomeSpace or a Shared Drive, copy the data residing on the file server, and compress, hash, and transmit the copied data to the collections server 130. The file server collection tool 134 may be programmed with preset instructions that allow it to only copy files meeting certain criteria, for example, files that have certain file extensions. Alternatively, the programmed instructions may prevent the file server collection tool 134 from copying files having certain file extensions or other attributes. Either of the foregoing is advantageous if the e-discovery manager is not interested in copying executable files or source code, for example. In some embodiments, the file server collection tool 134 is also configured to generate a size estimate of the files residing on the targeted file server. In one embodiment, the file server collection tool 134 may automatically begin the collection process (copying and transmitting data) if the size estimate falls below a predetermined threshold. In addition, in some embodiments, the file server collection tool 134 is configured to determine whether a particular folder that it is collecting from a file server includes more than a token amount of nearline files, and, in the event that the folder does include such nearline files, choose to not collect such files so as to avoid overloading the server. Therefore, according to different embodiments, the file server collection tool 134 copies all or a portion of the files residing on a file server located at the path given in the released custodian's profile and transmits them to the collections server 130.

If a custodian profile (for a custodian released for collection) includes an email address for an email account on the enterprise email server 160, then the electronic discovery management server 110 may undertake to collect the files from the enterprise email server 160 by initializing the active email collection tool 136 running on collections server 130 (as shown in FIG. 12). In some embodiments, the active email collection tool 136 is configured to access the particular Microsoft Exchange server within the enterprise email server 160 on which the custodian's account resides (which is known based on the information included in the Unified Directory 122), copy all email located there, including emails deleted by the custodian up to a predetermined period of time prior to the collection, (for example, seven days prior to the collection) and transmit the copied emails to the collections server 130.

Regardless of the storage resource location from which data is being collected, or the particular type of data being collected, the collections server 130 is configured to store the data first (while the collection is still ongoing) in the short-term staging drive 180 until the particular collection is complete, attach a barcode to the set of data resulting from the particular collection, and then copy the data set to the long-term storage area network 190 for permanent storage. Furthermore, the collections server 130 transmits the barcode information to the electronic discovery management server 110 to be stored in the database server 120, for example, in the custodian's profile in the Unified Database 122, in relation to the stored information about the particular collection, whether it was a local collection, an active email collection, a file server collection, etc. Therefore, the barcode can be used for reference at a later date to determine the origin of the data. After the data has been copied to the long-term storage area network 190, the collections server 130 compares the hashing of the data in permanent storage to the original data in the staging drive 180 and, if the hashing is identical, purges the data from the staging drive 180.

Once the data has entered the long-term storage area network 190, it is not necessarily ready for review. Indeed, it is likely that the data may need to be processed before it is searchable and suitable for review by investigators and attorneys. For example, the files may be encrypted in the form in which they are collected and sent to the long-term storage area network 190. Therefore, according to some embodiments, the data may be copied to the conversion services server 170 where a series of decryption and standardization functions may be applied to it. After the data is decrypted and standardized, it is returned to the long-term storage area network 190 and may remain there to be accessed for review purposes.

With reference now to FIG. 13, a block diagram is provided that illustrates the electronic discovery management structure of the present invention, according to some embodiments. As illustrated in FIG. 13, certain processes described herein may be categorized within one of case management, as represented by Block 200, custodian management, as represented by Block 220, or data management, as represented by Block 240. As described above, the electronic discovery system 100 is arranged such that cases, custodians and data may be managed independent of one another. However, there is still an element of the categorization of processes within the categories that is conceptual, and it should be understood that certain processes may be correctly assigned to more than one category. Therefore, while the architecture of the system 100 allows separate management of custodians, cases, and data, certain processes of the present invention may affect more than one of the foregoing.

The first process that falls within the case management category is creation of a matter or case as a framework for litigation support activities, as shown in Block 202. As described above, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager) etc.

It is noted that custodian information is stored separately from the case information allowing for the same custodian in multiple cases. This provides for the electronic discovery system of the present invention to have scalability, whereby evidence associated with one custodian may be used in multiple cases.

The electronic discovery management server 110 stores this information in the case database 124 in the database server 120. The case database 124 houses this information such that all information relating to a particular matter or case is related within the case database 124 and a user, such as a manager or contact, can use the user interface 118 to view and edit a profile of the matter or case.

The next process within case management is the creation of preservation notices and surveys specific to the matter, as shown in Block 204. In this regard, the e-discovery manager may, through the user interface 118, either generate a new preservation notices or surveys relevant to the particular case or matter to be stored in the case profile in the case database 124 or, alternatively, link a preservation notice or survey already stored in the database server 120 to the case profile of the specific case or matter at issue. Also within case management is the creation of search terms pertinent to the case, as represented by Block 206. As described above, the e-discovery manager or a contact or manager for the case may use the user interface 118 to input individual search terms or search term sets to be applied to the data harvested in the case. In some embodiments, the search terms may be limited to be used with particular custodians and/or with particular harvested data types. The search terms will be saved in the case database 124 so that they may be readily applied to harvested data and used in connection with storing the resulting responsive data.

The processes of entering relevant attachments, notes and updates to a particular case or matter also falls within the case management category, as demonstrated by Blocks 208 and 210. The e-discovery manager or a case contact or manager may use the user interface 118 to upload documents and enter notes and other relevant data, including updates and reminders, to be stored in the case profile of the case in the case database 124. Once these attachments, notes and updates are added, they may be referenced whenever a user views the case profile through the user interface 118. The cost estimation modules of the present invention are also processes that are categorized as case management processes, as shown in Block 212. In this regard, the electronic discovery management server 110 utilizes a cost estimation tool to determine the cost of harvesting and reviewing data, based on a number of factors including, for example, number of custodians, amount of harvested data, data types, etc. Finally, case management also includes a number of tasking and workflow processes that are represented by block 214.

Moving now to custodian management, certain processes falling within the category of custodian management are shown in Block 220. While the processes involving generation of the Unified Directory 122 certainly could be categorized as custodian management, the processes shown in FIG. 13 include those processes involving management of custodians within the scope of a case or matter. In that regard, the first process of custodian management included in FIG. 13 is the addition of custodians to a case or matter, as shown in Block 222. As described above, the e-discovery manager may use the user interface 118 to link a custodian's profile from the Unified Directory 122 to the particular case profile in the case database 124. Thus, the custodian profile and case profile are correlated. The next processes within custodian management is the transmission of preservation notices and surveys to custodians, as shown in Block 224, and the presentation of the surveys to custodians, as shown in Block 226. The electronic discovery management server 110 uses the contact information in the custodian's profile in the Unified Directory 122 to transmit the preservation notice(s) and survey(s) stored in the case profile to the custodian. In some embodiments, a standard email function is used, so that the only information needed from the Unified Directory 122 is the custodian's email address. When the custodian checks her email, the survey will appear as a message therein, and when she opens that message, the survey will be presented to her. The survey may be configured such that when she fills it out, the survey is automatically transmitted back to the database server 120 for storage in the case profile and the custodian's profile.

Also falling within custodian management is the process of releasing custodians from a matter to a case, as shown in Block 228. The e-discovery manager uses the user interface 118 to mark the custodian's profile so that the custodian is now activated for collection of data. This may occur within the case database 124 since the custodian's profile is linked thereto. Once the custodian is released/marked, the electronic discovery management server 110 may access the custodian's profile and initialize collection based on the various data storage locations identified in the profile. Therefore, as represented by Block 230, the electronic discovery management server 110 may automatically determine the data types and locations of data to be harvested by accessing the custodian's profile in the Unified Directory 122. Alternatively, the e-discovery manager may manually make the same determination by accessing and viewing the custodian's profile. Finally, as with case management, custodian management also includes a number of tasking and workflow processes that are represented by Block 232.

The last category is data management, represented by Block 240. One major set of processes within data management are the processes relating to the harvesting of data, as shown in Block 242. These processes include the collection of data from all the different storage areas of a particular custodian, including the custodian's local storage on her personal computer(s), the custodian's network storage areas, the custodian's email, and any other areas, as are described herein. All of the data in the various storage areas is copied and transmitted to the collections server 130, as described in detail for each particular collection tool or process. Upon reaching the collections server 130, data resulting from a particular collection is temporarily stored in the short-term staging drive 180 until the collection is complete, at which point it is stored in the long-term storage area network 190 in association with a specific identifying barcode. The foregoing process is represented by Block 244. The data may require decryption or standardization functions to be applied to it in order for it to be searchable and/or otherwise usable, so the next process that falls within data management is the copying of the data to the conversion services server 170 for analysis and conversion as necessary, as shown in Block 246. Once the data is converted, it is returned to the long-term storage area network 190 to be used in review.

Also falling within data management is the association of particular data sets with particular sets of search terms stored in the case profile of the case database 124. In this regard, certain search terms stored in the case profile are stored with the intention of being applied to certain types of data and/or certain custodian's data. Alternatively, certain search terms may be applied to all data collected for a specific case. In either instance, the electronic discovery management server 110 accesses the case profile, determines the search terms to be applied, and associates the search terms with the barcode of the appropriate data sets in long-term storage. Thus, the search terms will be applied to that data and the results will be generated and presented to reviewers for analysis. Finally, as with the other management categories, data management also includes a number of tasking and workflow processes that are represented by Block 250.

With reference to FIG. 14, an exemplary process for managing a case is provided, in accordance with one embodiment of the present invention. As represented by Block 302, a case or matter is created by the e-discovery manager and stored in the case database 124. Next, custodians are added to the case, as shown in Block 304, by linking the custodian profiles of the Unified Directory 122 to the case profile. Next, as represented by Block 306, the e-discovery manager and/or the case contact or manager adds search terms to be applied to data harvested for the case, including instructions as to applying the search terms to particular data types or custodians. Block 310 represents the determination that must be made as to whether there is a matter or just a case. If there is no matter because preservation notices are not required, for example, for an audit, then the process will move straight to the initialization of data collection. On the other hand, if there is matter, rather than just a case, then the creation of preservation notices is required, as shown in Block 312.

The preservation notice, as shown in Block 314 is transmitted to the custodians added to the matter, perhaps using email. As shown in Block 316, a reminder notice module may be employed. As shown in Block 318, the reminder notice module transmits periodic reminder notices to custodians. The notices may be sent over email and may remind custodians about the preservation notice and/or remind custodians to fill out surveys. With regard to surveys, in the event a survey is required or desired, according to Block 320, a survey is created. The survey may be saved in the case profile in the case database 124. As shown in Block 322, it is possible to enable the survey to be attached to and transmitted with the preservation notices.

Next, as shown in Block 324, the e-discovery manager may release custodians from the matter to the case, which initialized collection of the custodian's data. As shown in Block 326, the e-discovery manager or the electronic discovery management server 122 accesses the custodian profile, determines the data types and location to be collected, and initializes the applicable collection tools to go collect the data. Once the data has been collected and a unique barcode has been assigned to each dataset based on the particular custodian and storage location from which it originated, as shown in Block 328, the search terms previously stored in the case profile may be assigned to the dataset based on the input instructions regarding the search terms. These search terms may be applied to the dataset and the results saved to be presented to reviewers for analysis.

With reference to FIG. 15, an exemplary process for managing a custodian is provided, in accordance with one embodiment of the present invention. First, as represented by Block 402, a custodian is added to a matter or case. In this regard, the custodian's profile in the Unified Directory 122 is linked to the relevant case or matter profile. In order to locate the custodian's profile, a custodian search module may be employed, as shown in Block 404. Therefore, the e-discovery manager may enter any identifying information about the custodian, whether it is the custodian's name, network user identification, email address, etc. The custodian search module will take the input information and search the Unified Directory 122 for a match. If more than one match is obtained, the user interface 118 will present all matches and allow the e-discovery manager to browse the associated profiles to determine the intended custodian. In this way, the correct custodian is identified and the profile of that custodian is linked to the appropriate case or matter.

As represented by Block 406, the electronic discovery management server 110 may determine whether the particular custodian added is a member of the enterprise "do-not-call list." In this regard, there may be an indication in the custodian's profile in the Unified Directory 122 that the particular custodian should not be contacted regarding collections, and an alternative contact should be used, such as an administrative assistant of the custodian. Alternatively, there may be a separate do-not-call list stored in the database server 120 that must be accessed and searched to determine whether or not the custodian appears on that list. In either instance, a determination is made as to whether or not the custodian should be directly contacted, and in the event the custodian should not be directly contacted, the contact information for the custodian's assistant (or other stand-in) should be obtained. This information will be used later for transmitting preservation notices and surveys.

Next, in accordance with Block 408, a determination is made by the electronic discovery management server 110 as to whether the custodian has been added to a matter or a case. If it is a case, then the custodian is verified, as shown in Block 424, supplemental data may be added to the custodian profile in the Unified Directory 122 as required, as shown in Block 426, and then the various collection tools are initialized by the electronic discovery management server 110 for collection of the custodian's data, as shown in Block 428. On the other hand, if it is a matter, then preservation notices are required. Therefore, as shown in Block 410, a preservation notice is sent via email to the custodian or custodian stand-in. As shown in Block 412, the custodian may then be inactivated from the case because, for some reason, data does not need to be collected from the custodian. In the future, when it comes time to collect from the custodian, the custodian will be reactivated, as shown in Block 422.

After a preservation notice is sent, a determination is made by the electronic discovery management server 110 as to whether a survey is required, as shown in Block 414. It should be noted that in alternate embodiments the decision on whether to send a survey may be made prior to sending the preservation notice. In such alternate embodiments, if the survey is required, it may become a component of the preservation notice and, thus, accessed simultaneously by the custodian. If a survey is required, it is transmitted in conjunction with a preservation notice, and the answers are collected by the electronic discovery management server 110 and stored in the database server 120, as shown in Block 416. Reminder notices for the preservation notices and surveys may also be transmitted to the custodian, as shown in Block 420. Next, once it is time to collect data, the custodian is released from the matter to the case, as shown in Block 418, and the various collection tools are initialized by the electronic discovery management server 110 for collection of the custodian's data, as shown in Block 428. In this process, the custodian's profile in the Unified Directory 122 is accessed in order to determine the various locations where the custodian may have stored data. Finally, as shown in Block 430, the custodian's data is collected.

Referring to FIGS. 8 and 9, flow diagrams are presented of a method 500 for harvest data from various data sources, in accordance with embodiments of the present invention. At Event 502, the collection of data ensues and, at Event 504, the type of data is identified. Data Block 506 signifies active email that is collected from an exchange system or the like. At Event 508 the automated active email collection tool is implemented to collect email from identified email address. As previously noted, and in accordance with present embodiments of the invention, if a custodian profile (for a custodian released for collection) includes an email address for an email account on the enterprise email server (160), then the electronic discovery management server (110) may undertake to collect the files from the enterprise email server (160) by initializing the active email collection tool (136) running on collections server (130). In some embodiments, the active email collection tool (136) is configured to access the particular Microsoft Exchange server within the enterprise email server 160 on which the custodian's account resides (which is known based on the information included in the Unified Directory 122), copy all email located there, including emails deleted up to a designated prior period, for example, seven days prior to the collection, and transmit the copied emails to the collections server (130). The email collection tool is also capable of implementing bulk requests and for collecting email on a scheduled basis, such as daily. The email collection tool is additionally capable of being implementing enterprise-wide and requires no server identifiers or the like to collect the active email. In this regard, the email collection tool (136) serves to reduce security risk.

At Event 510, a barcoding tool is implemented at a staging location, such as short-term staging drive (180) to attach a barcode to the set of email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180). As such, barcoding is performed without the need to execute the barcoding tool on an exchange server and, as such no human intervention is needed in the barcode process. In accordance with embodiments of the present invention, one barcode may be assigned per custodian, per data type and per event (i.e., case, matter, etc.)

At Event 512, the collected email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 514, the collected and barcoded active email data is copied to a processing drive for subsequent analysis. It should be noted that the nature of email data obviates the need to perform conversion and/or decryption on the data set. At Event 516, the active email data set is loaded into the analysis tool and, at Event 518, the data set is exported to the requestor/reviewer for analysis.

Data Block 520 signifies other non-exchange server based email, such as email accessed through a client-server, collaborative application, such as Lotus Notes® or the like. At Event 522, NSF files or any other file types associated with non-exchange server based email is manually harvested from an enterprise-grade email server having collaborative capabilities, such as a Lotus Domino server or the like.

At Event 522, a barcoding tool is implemented at a staging location, such as short-term staging drive (180) to attach a barcode to the set of non-exchange server email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180).

At Event 526, the collected non-exchange server email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 528, the NSF files or any other file types associated with non-exchange server based email that may be encrypted is decrypted using a decryption tool, in accordance with embodiments of the present invention. The encryption of NSF files occurs at the user level and, therefore only the user has the password necessary for decryption. The decryption tool allows for decryption of the NSF file-type data without the knowledge of the user/encrypter. The decryption tool finds ID files that exist anywhere in the enterprise system, creates a database of the ID files, associates the database with the user/encrypter and subsequently decrypts the data.

At Event 530, the non-exchange server email data set is loaded into the analysis tool and, at Event 532, the data set is exported to the requestor/reviewer for analysis.

Data Block 534 signifies journaled data, such as electronic commerce data stored on a repository for the purpose of regulation, compliance to regulating bodies, such as the Securities and Exchange Commission (SEC) or the like. At Event 536, criteria is extracted from input system and manually entered in a designated third party system for data retrieval.

At Event 538, the barcoding tool is implemented at a staging location, such as short-term staging drive (180) to attach a barcode to the set of journaled data resulting from the particular collection. The barcoded data is then copied and communicated to the long-term storage area network (190) for permanent storage. At Event 540, the collected and barcoded journaled data may be associated with a specific search term set or sets.

At Event 542 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files and the like.

At Event 544, the journaled data set is loaded into the analysis tool and, at Event 546, the journaled data set is exported to the requestor/reviewer for analysis.

Referring to FIG. 16, data block 548 signifies data from a local Personal Computer (PC), such as enterprise PC (140). At Event 550, the local collection tool (132) is implemented to collect data from designated PCs by taking a "snapshot" of the device's hard drive. According to one embodiment of the invention, the local collection tool may be autodeployed thus, obviating the need for any manual entry by the e-discovery manager or the like. In other embodiments of the invention, the local collection tool (132) may be employed to collect data from network storage.

At Event 552, the barcoding tool is implemented at a staging location, such as short-term staging drive (180) to attach a barcode to the set of local PC data resulting from the particular collection. The barcoded data is then copied and communicated to the long-term storage area network (190) for permanent storage. At Event 554, the collected and barcoded local PC data may be associated with a specific search term set or sets.

At Event 556 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files, IPD formatted files and the like.

At Event 558, the local PC files that may be encrypted are decrypted using a decryption tool, in accordance with embodiments of the present invention. The decryption tool allows for decryption of the PC files data without the knowledge of the user/encrypter. The decryption tool finds ID files that exist anywhere in the enterprise system, creates a database of the ID files, associates the database with the user/encrypter and subsequently decrypts the data.

At Event 560, the local PC data set is loaded into the analysis tool and, at Event 562, the local PC data set is exported to the requestor/reviewer for analysis.

Data block 564 signifies data from network storage, such as a shared drive or HomeSpace. At Event 566, the file server collection tool (134) is implemented to automatically collect data from shared drives and/or HomeSpace. According to one embodiment of the invention, the file server collection tool (134) may be autodeployed thus, obviating the need for any manual entry by the e-discovery manager or the like.

At Event 568, the barcoding tool is implemented at a staging location, such as short-term staging drive (180) to attach a barcode to the set of network storage data resulting from the particular collection. The barcoded data is then copied and communicated to the long-term storage area network (190) for permanent storage. At Event 570, the collected and barcoded network storage data may be associated with a specific search term set or sets.

At Event 572 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files, IPD formatted files and the like.

At Event 574, the network storage files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 576, the network storage data set is loaded into the analysis tool and, at Event 578, the network storage data set is exported to the requestor/reviewer for analysis.

Data block 580 signifies electronic data for forensics. At Event 582, a forensic collector tool, such as EnCase® may be executed on the devices of interest to collect data. According to one embodiment of the invention, the forensic collector tool may be automatically deployed on the device of interest without the knowledge of the device user. In accordance with another embodiment of the invention, a computer watcher tool may be implemented (not shown in FIG. 16) that watches the network to determine the addition or subtraction of computers to the network based on ID's/IP addresses returned from the network.

At Event 584, the barcoding tool is implemented at a staging location, such as short-term staging drive (180) to attach a barcode to the set of forensic data resulting from the particular collection. The barcoded data is then copied and communicated to the long-term storage area network (190) for permanent storage. At Event 586, the collected and barcoded forensic data may be associated with a specific search term set or sets.

At Event 588 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing may be required on EML formatted files, MSG formatted files, IPD formatted files and the like.

At Event 590, the forensic files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 592, the forensic data set is loaded into the analysis tool and, at Event 594, the network storage data set is exported to the requestor/reviewer for analysis.

Data block 596 signifies collaborative data, such as data residing at discovery sites, for example LiveLink® or the like. At Event 598, a discovery site collector tool, such as a LiveLink® collector tool may be executed on the devices of interest to collect data. According to one embodiment of the invention, the discovery site collector preserves at least a portion of the discovery site database in the e-discovery database, including all files and all revisions of the files. In this regard, the discovery site collector tool queries against the database to define what files need to be retrieved, then copies those files based on the result of the query. Metadata pertaining to the files is retained in the case management system tables. In accordance with another embodiment of the invention, the discovery site collector tool collects the documents and the related metadata and uses the metadata to automatically rename the files.

At Event 600, the barcoding tool is implemented at a staging location, such as short-term staging drive (180) to attach a barcode to the set of discovery site data resulting from the particular collection. The barcoded data is then copied and communicated to the long-term storage area network (190) for permanent storage. At Event 602, the collected and barcoded discovery site data may be associated with a specific search term set or sets.

At Event 604 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing may be required on EML formatted files, MSG formatted files, IPD formatted files and the like.

At Event 606, the discovery site data set is loaded into the analysis tool and, at Event 608, the discovery site data set is exported to the requestor/reviewer for analysis.

Thus, present embodiments herein disclosed provide for improvements in electronic discovery. Embodiments herein disclosed provide for an enterprise-wide e-discovery system that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for electronic communication file conversion in an enterprise-wide electronic data discovery system, the method comprising:

creating, in a computing device memory, one or more custodian profiles comprising a history of storage locations used by the one or more custodians, wherein the history is automatically generated in response to monitoring the computer usage of the one or more custodians, wherein the storage locations are locations in which one or more files are stored, and wherein creating the one or more custodian profiles further comprises:

associating each individual custodian profile with an identifier of the custodian associated with the individual custodian profile; and updating each individual custodian profile at regularly scheduled intervals based at least partially in response to determining the update is related to the identifier of the custodian associated with the individual custodian profile;

receiving, by a computer processing device, a data request to capture electronic data including electronic communication files for one or more custodians, wherein at least one of the electronic communication files is a meeting request, and wherein the electronic data is one or more compression scheme files;

determining, by a computing processing device, based on the one or more custodian profiles, one or more storage locations in which the one or more custodians stored the electronic data;

capturing the electronic data including electronic communication files from the one or more custodians based on the data request, wherein at least a portion of the electronic data is captured from the one or more storage locations determined;

storing, in computing device memory, the captured electronic data;

extracting the electronic communication files from the one or more compression scheme files;

automatically identifying, by a computing device processor, at least one of the electronic communication files as a meeting request;

determining, for each of the meeting requests, one or more task requests associated with the electronic communication files;

automatically determining, by a computing device processor, that file conversion is necessary for one or more of the electronic communication files;

automatically determining, by a computing device processor, a predetermined file format to which the electronic communication files will be converted, wherein the predetermined file format is a meeting appointment where the electronic communication file is a meeting request;

automatically converting, by a computing device processor, one or more of the electronic communication files to the predetermined file format, wherein converting the electronic communication files comprises re-formatting the electronic communication files, and wherein one or more of the meeting requests are converted to meeting appointments, wherein converting further comprises converting the one or more task requests to a file format compatible to be associated with the meeting appointment;

storing, in the computing device memory, the converted one or more electronic communication files;

removing the electronic communication files from the one or more compression scheme files based on the electronic communication files being converted;

determining whether the one or more compression scheme files are empty based on removing the electronic communication files;

removing, from memory, the one or more compression scheme files that are empty;

forwarding the compression scheme files that are not empty for quality control processing; and outputting, by a computing device processor, indices related to file conversion of the electronic communication files, wherein the indices include, a number of files undergoing format change, type of format change, number of email messages, number of other type entries, the number messages/entries undergoing form change, the type of form change, the number of email messages undergoing form change, and the number of appointments undergoing form change.

2. The method of claim 1, wherein converting one or more of the electronic communication files to the predetermined file format further comprises converting one or more of the electronic communication files to a predetermined file format supported by a third-party electronic data presentation entity.

3. The method of claim 1, wherein automatically converting one or more of the electronic communication files further comprises converting one or more electronic communication files to Personal Storage Table (.PST) format.

4. The method of claim 3, wherein converting one or more electronic communication files to .PST format further comprises converting one or more electronic communication files to .PST format based on identifying the file type as one other than .PST format.

5. The method of claim 1, wherein automatically identifying file type further comprises identifying a mobile communication back-up file type as one of the electronic communication file types.

6. The method of claim 5, wherein identifying the mobile communication back-up file type further comprises identifying an .IPD back-up file for one or more electronic communication files.

7. The method of claim 5, further comprising extracting, by a computing device processor, individual electronic communication messages from electronic communication files identified as mobile communication back-up file type.

8. The method of claim 7, wherein automatically converting one or more of the electronic communication files further comprises converting the electronic communication messages extracted from the mobile communication back-up file to a predetermined file format.

9. The method of claim 1, wherein automatically identifying file type further comprises identifying Electronic Mail (.EML) file type as one of the electronic communication file types and wherein automatically converting, further comprises converting electronic communication files identified as .EML file type to a predetermined file format.

10. The method of claim 1, wherein automatically identifying file type further comprises identifying Message (.MSG) file type as one of the electronic communication file types and wherein automatically converting further comprises converting electronic communication files identified as .MSG file type to a predetermined file format.

11. The method of claim 1, wherein automatically identifying file type further comprises identifying a compression scheme file type as one of the electronic communication file types.

12. The method of claim 11, further comprising extracting, by a computing device processor, one or more electronic communication files from an identified compression scheme file.

13. The method of claim 12, wherein automatically converting one or more of the electronic communication files further comprises converting one or more of the extracted electronic communication files to a predetermined file format.

14. The method of claim 1, further comprising identifying, by a computing device processor, one or more encrypted entries in one or more electronic communication files.

15. The method of claim 14, further comprising automatically decrypting, by a computing device processor, the one or more encrypted entries.

16. The method of claim 1, wherein automatically identifying file type further comprises identifying Notes Storage Facility (.NSF) file type for one or more of the electronic communication files.

17. The method of claim 16, further comprising identifying, by a computing device processor, one or more encrypted entries in the one or more .NSF file type electronic communication files.

18. The method of claim 17, further comprising automatically decrypting, by a computing device processor, the one or more encrypted entries.

19. The method of claim 18, further comprising converting, by a computing device processor, one or more entries in the .NSF file type electronic communication file to a third-party data presentation-supported entry format.

20. The method of claim 1, wherein the storage locations comprise at least one of a personal computing device, an email account, network storage area, and shared drive, and wherein capturing the electronic data comprises retrieving machine information associated with the at least one a personal computing device, an email account, network storage area, and shared drive such that the electronic data is capture from the storage locations based at least partially on the retrieved machine information.

21. A computer program product comprising:

a non-transitory computer-readable medium of a computing device, wherein the computing device comprises one or more processors for executing instruction code stored within the non-transitory computer-readable medium, and wherein the non-transitory computer readable medium comprises:

a first set of codes for causing a computer to create one or more custodian profiles comprising a history of storage locations used by the one or more custodians, wherein the history is automatically generated in response to monitoring the computer usage of the one or more custodians, wherein the storage locations are locations in which one or more files are stored, and wherein creating the one or more custodian profiles further comprises:

associating each individual custodian profile with an identifier of the custodian associated with the individual custodian profile; and updating each individual custodian profile at regularly scheduled intervals based at least partially in response to determining the update is related to the identifier of the custodian associated with the individual custodian profile;

a second set of codes for causing a computer to receive a data request to capture electronic data including electronic communication files for a plurality of custodians, wherein at least one of the electronic communication files is a meeting request, and wherein the electronic data is one or more compression scheme files;

a third set of codes for causing a computer determine based at least partially on the one or more custodian profiles, one or more storage locations in which the one or more custodians stored the electronic data;

a fourth set of codes for causing a computer to capture the electronic data including electronic communication files from the plurality of custodians based on the data request, wherein at least a portion of the electronic data is captured from the one or more storage locations determined;

a fifth set of codes for causing a computer to store the captured electronic data;

a sixth set of codes for extracting the electronic communication files from the one or more compression scheme files;

a seventh set of codes for causing a computer to automatically identify at least one of the electronic communication files as a meeting request;

an eighth of codes for determining, for each of the meeting requests, one or more task requests with the electronic communication files;

a ninth set of codes for causing a computer to automatically determine that file conversion is necessary for one or more of the electronic communication files;

a tenth set of codes for causing a computer to automatically determine a predetermined file format to which the electronic communication files will be converted, wherein the predetermined file format is a meeting appointment where the electronic communication file is a meeting request;

an eleventh set of codes for causing a computer to automatically convert one or more of the electronic communication files to the predetermined file format wherein converting the electronic communication files comprises re-formatting the electronic communication files, and wherein the eleventh set of codes is configured to cause the computer to automatically convert meeting requests to meeting appointments, wherein converting further comprises converting the one or more task requests to a file format compatible to be associated with the meeting appointment;

a twelfth set of codes for causing a computer to store the converted one or more electronic communication files;

a thirteenth set of codes for causing a computer to remove the electronic communication files from the one or more compression scheme files based on the electronic communication files being converted;

a fourteenth set of codes for causing a computer to determine whether the one or more compression scheme files are empty based on removing the electronic communication files;

a fifteenth set of codes for causing a computer to remove, from memory, the one or more compression scheme files that are empty;

a sixteenth set of codes for causing a computer to forward the compression scheme files that are not empty for quality control processing; and a seventeenth set of codes for causing a computer to output indices related to file conversion of the electronic communication files, wherein the indices include, a number of files undergoing format change, type of format change, number of email messages, number of other type entries, the number messages/entries undergoing form change, the type of form change, the number of email messages undergoing form change, and the number of appointments undergoing form change.

22. The computer program product of claim 21, wherein the eleventh set of codes is further configured to cause the computer to automatically convert one or more of the electronic communication files to a predetermined file format supported by a third-party electronic data presentation entry.

23. The computer program product of claim 21, wherein the eleventh set of codes is further configured to cause the computer to automatically convert one or more electronic communication files to Personal Storage Table (.PST) format.

24. The computer program product of claim 21, wherein the seventh set of codes is further configured to cause the computer to identify a mobile communication back-up file type.

25. The computer program product of claim 24, wherein the seventh set of codes is further configured to cause the computer to identify an .IPD back-up file type.

26. The computer program product of claim 24, further comprising an eighteenth set of codes for causing a computer to extract individual electronic communication messages from electronic communication files identified as mobile communication back-up file type.

27. The computer program product of claim 26, wherein the eleventh set of codes is further configured to cause the computer to automatically convert the electronic communication messages extracted from the mobile communication back-up file to a predetermined file format.

28. The computer program product of claim 21, wherein the seventh set of codes is further configured to cause the computer to identify an Electronic Mail (.EML) file type for one or more of the electronic communication files and wherein the ninth set of codes is further configured to cause the computer to automatically convert electronic communication files identified as .EML file type to a predetermined file format.

29. The computer program product of claim 21, wherein the seventh set of codes is further configured to cause the computer to identify a Message (.MSG) file type for one or more of the electronic communication files and wherein the ninth set of codes is further configured to cause the computer to automatically convert electronic communication files identified as .MSG file type to a predetermined file format.

30. The computer program product of claim 21, wherein the seventh set of codes is further configured to cause the computer to identify a compression scheme file type for one or more of the electronic communication files.

31. The computer program product of claim 30, further comprising an eighteenth set of codes for causing a computer to extract one or more electronic communication files from electronic communication files identified as compression scheme file type.

32. The computer program product of claim 30, wherein the eleventh set of codes is further configured to cause the computer to automatically convert one or more of the extracted electronic communication files to a predetermined file format.

33. The computer program product of claim 21, further comprising an eighteenth set of codes for causing a computer to identify one or more encrypted entries in one or more electronic communication files.

34. The computer program product of claim 33, further comprising an eighteenth set of codes for causing a computer to automatically decrypt the one or more encrypted entries.

35. The computer program product of claim 21, wherein the seventh set of codes is further configured to cause the computer to identify Notes Storage Facility (.NSF) file type for one or more of the electronic communication files.

36. The computer program product of claim 35, further comprising an eighteenth set of codes for causing a computer to identify one or more encrypted entries in the one or more .NSF file type electronic communication files and a nineteenth set of codes for causing a computer to automatically decrypt the one or more encrypted entries.

37. The computer program product of claim 36, further comprising an eighteenth set of codes for causing a computer to convert one or more entries in the .NSF file type to a predetermined entry format.

38. The computer program product of claim 21, wherein the storage locations comprise at least one of a personal computing device, an email account, network storage area, and shared drive, and wherein the fifth set of codes is configured to cause the computer to retrieve machine information associated with the at least one a personal computing device, an email account, network storage area, and shared drive such that the electronic data is capture from the storage locations based at least partially on the retrieved machine information.

* * * * *